(12) United States Patent
Xia et al.

(10) Patent No.: US 8,854,321 B2
(45) Date of Patent: Oct. 7, 2014

(54) METHODS AND SYSTEMS FOR FACILITATING DATA ENTRY BY WAY OF A TOUCH SCREEN

(75) Inventors: Tiejun J. Xia, Richardson, TX (US); Glenn A. Wellbrock, Wylie, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 762 days.

(21) Appl. No.: 13/099,310

(22) Filed: May 2, 2011

(65) Prior Publication Data
US 2012/0280916 A1    Nov. 8, 2012

(51) Int. Cl.
G06F 3/041 (2006.01)
G06F 3/0488 (2013.01)
G06F 3/033 (2013.01)

(52) U.S. Cl.
CPC .......... *G06F 3/0334* (2013.01); *G06F 3/04883* (2013.01)
USPC .......................................... 345/173; 345/178

(58) Field of Classification Search
CPC ....... G06F 3/017; G06F 3/0325; G06F 3/041; G06F 3/0425; G06F 3/0482; G06F 3/0485; G06F 3/04883; G06F 2203/04808
USPC .................. 345/1.3, 156–179, 428, 659, 661; 715/769, 773, 799, 847; 382/189; 178/19.07, 30, 35, 38
See application file for complete search history.

(56) References Cited

U.S. PATENT DOCUMENTS

| | | | | |
|---|---|---|---|---|
| 2,904,631 A * | 9/1959 | Anderson et al. | ........... | 178/19.07 |
| 4,727,588 A * | 2/1988 | Fox et al. | ...................... | 382/189 |
| 5,511,148 A * | 4/1996 | Wellner | ......................... | 358/1.6 |
| 7,605,804 B2 * | 10/2009 | Wilson | ........................... | 345/173 |
| 7,990,398 B2 * | 8/2011 | Pelletier et al. | ............... | 345/648 |
| 8,286,098 B2 * | 10/2012 | Ju et al. | .......................... | 715/849 |
| 8,292,807 B2 * | 10/2012 | Perkins et al. | ................. | 600/301 |
| 8,294,688 B2 * | 10/2012 | Sarasmo | ....................... | 345/174 |
| 8,451,236 B2 * | 5/2013 | Duarte et al. | .................. | 345/173 |
| 2004/0160410 A1 * | 8/2004 | Plathe | ............................ | 345/156 |
| 2008/0148147 A1 * | 6/2008 | Poston et al. | .................. | 715/273 |
| 2008/0304420 A1 * | 12/2008 | Deragon et al. | .............. | 370/249 |
| 2010/0045705 A1 * | 2/2010 | Vertegaal et al. | ............. | 345/661 |
| 2010/0064536 A1 * | 3/2010 | Caskey et al. | .................. | 33/303 |
| 2010/0085274 A1 * | 4/2010 | Kilpatrick et al. | ............. | 345/1.3 |
| 2010/0235786 A1 * | 9/2010 | Maizels et al. | ................. | 715/810 |
| 2010/0253640 A1 * | 10/2010 | Zhan et al. | ..................... | 345/173 |
| 2010/0265200 A1 * | 10/2010 | Cho et al. | ....................... | 345/173 |
| 2010/0277417 A1 * | 11/2010 | Sarasmo | ........................ | 345/173 |
| 2011/0098921 A1 * | 4/2011 | Miller et al. | ................... | 701/207 |
| 2011/0199393 A1 * | 8/2011 | Nurse et al. | .................... | 345/665 |
| 2012/0200507 A1 * | 8/2012 | Flam et al. | ..................... | 345/173 |

* cited by examiner

*Primary Examiner* — Prabodh M Dharia

(57) ABSTRACT

An exemplary method includes 1) detecting an initialization action performed by a first extremity of a user and a second extremity of the user, the initialization action comprising a touching of a first arbitrary location on the touch screen by the first extremity and a touching of a second arbitrary location on the touch screen by the second extremity, 2) designating, in response to the initialization action, the first arbitrary location as a first reference position and the second arbitrary location as a second reference position, 3) detecting one or more tapping actions performed on the touch screen, 4) determining a relative position on the touch screen of each of the one or more tapping actions with respect to the first and second reference positions, and 5) identifying one or more data entry commands associated with the one or more tapping actions. Corresponding methods and systems are also disclosed.

25 Claims, 24 Drawing Sheets

| Tapping (left) | Tapping (right) | Data Entry Command |
|---|---|---|
| PL1, PL2 | PR1, PR2 | initialization |
| L1 | R1 | a |
| L1 | R2 | b |
| L1 | R3 | c |
| L1 | R4 | d |
| L1 | R5 | e |
| L2 | R1 | f |
| L2 | R2 | g |
| L2 | R3 | h |
| L2 | R4 | i |
| L2 | R5 | j |
| L3 | R1 | k |
| L3 | R2 | l |
| L3 | R3 | m |
| L3 | R4 | n |
| L3 | R5 | o |
| L3 | R1 | p |
| L4 | R2 | q |
| L4 | R3 | r |
| L4 | R4 | s |
| L4 | R5 | t |
| L4 | R1 | u |
| L5 | R2 | v |
| L5 | R3 | w |
| L5 | R4 | x |
| L5 | R5 | y |
| L2, L3 | R2 | z |
| L5 | | 1 |
| L4 | | 2 |
| L3 | | 3 |
| L2 | | 4 |
| L1 | | 5 |
| R1 | | 6 |
| R2 | | 7 |
| R3 | | 8 |
| R4 | | 9 |
| R5 | | 0 |
| L2 moves right or left | | Tab |
| L2 moves up | | Shift |
| | SR3, SR4 | Enter |

Fig. 7

Online Project Help Request Form

Project: [Please select a Project ▼]

Category: [Please select a Category ▼]

Subject:

Description of Problem:

Additional Instructions:

[Submit]  [Cancel]

Online Project Help Request Form

Project: [Please select a Project ▽]

Category: [Please select a Category ▽]

Subject: He

Description of Problem:

Additional Instructions:

[Submit] [Cancel]

Fig. 12

Online Project Help Request Form

Project: [Please select a Project ▽]

Category: [Please select a Category ▽]

Subject: [Hel]

Description of Problem:

Additional Instructions:

[Submit]  [Cancel]

Online Project Help Request Form

Project: Please select a Project

Category: Please select a Category

Subject: Help

Description of Problem:

Additional Instructions:

Submit  Cancel

Fig. 15

METHODS AND SYSTEMS FOR FACILITATING DATA ENTRY BY WAY OF A TOUCH SCREEN

BACKGROUND INFORMATION

Many modern computing devices, such as tablet computers, smart phones, and the like, include a touch screen configured to facilitate user interaction with one or more applications executed by the computing devices. For example, a computing device may be configured to display a virtual keyboard on a touch screen. A user may tap or touch various buttons displayed within the virtual keyboard to provide text-based input to the computing device.

Unfortunately, virtual keyboards have various inherent disadvantages associated therewith. For example, many virtual keyboards occupy a significant portion of a touch screen, thereby making it difficult for a user to view other content on the touch screen while providing text-based input. Furthermore, a user typically has to look at the virtual keyboard as he or she uses it because there is no tactile feedback similar to that associated with physical keyboards. Yet another disadvantage of virtual keyboards is that they typically have fixed positions and sizes, thereby making it difficult for users with relatively large hands or with special needs to use them.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 7 shows a look up table defining a plurality of associations between tapping actions and data entry commands according to principles described herein.

Figure 9:
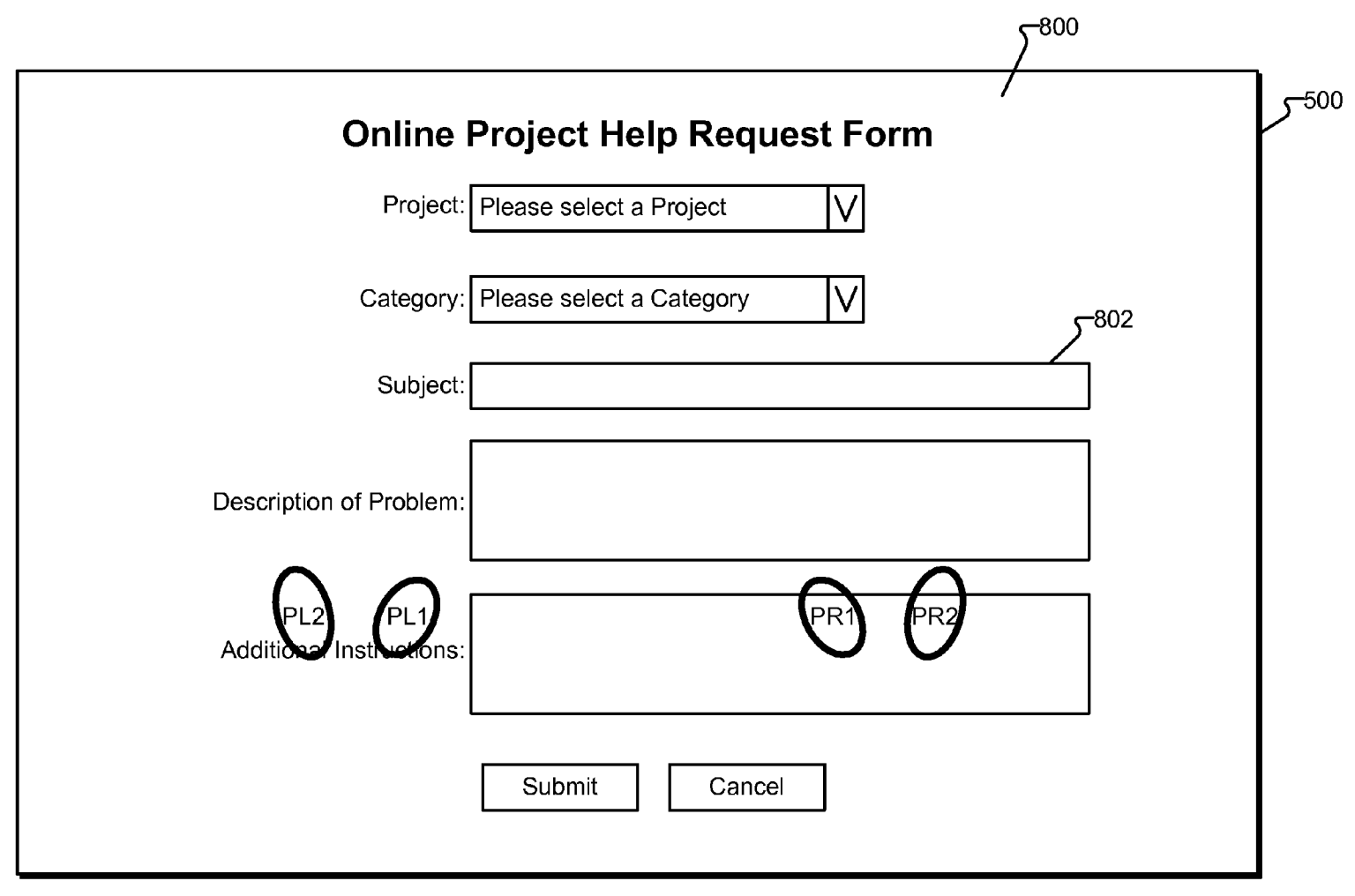

FIGS. 8-14 illustrate an example of facilitating data entry by way of a touch screen according to principles described herein.

FIG. 15 illustrates an exemplary embodiment wherein reference markers are displayed on a touch screen according to principles described herein.

DETAILED DESCRIPTION OF PREFERRED EMBODIMENTS

Figure 1:
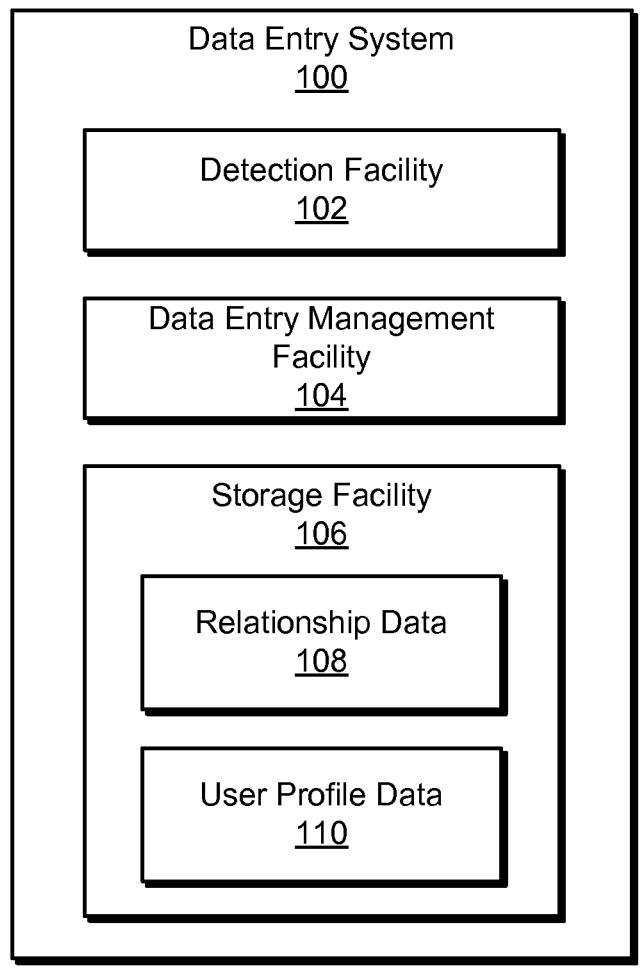
FIG. 1 illustrates an exemplary data entry system according to principles described herein.

Methods and systems for facilitating data entry by way of a touch screen are described herein. For example, a data entry system may detect an initialization action performed by a first extremity (e.g., the left hand) of a user and a second extremity (e.g., the right hand) of the user with respect to a touch screen associated with a computing device. The initialization action may include a touching of a first arbitrary location on the touch screen by the first extremity of the user and a touching of a second arbitrary location on the touch screen by the second extremity of the user. In response to the initialization action, the data entry system may designate the first arbitrary location as a first reference position associated with the first extremity and the second arbitrary location as a second reference position associated with the second extremity. The data entry system may then detect one or more tapping actions performed on the touch screen by one or more human input elements (e.g., one or more fingers) included in a plurality of human input elements that are a part of the first and second extremities. The data entry system may then determine a relative position on the touch screen of each of the one or more tapping actions with respect to the first and second reference positions and identify one or more data entry commands (e.g., one or more keyboard input commands) associated with the one or more tapping actions based on the relative position of each of the one or more tapping actions with respect to the first and second reference positions.

As will be described below, the methods and systems described herein may allow a user to provide data entry commands by way of a touch screen without a virtual keyboard being displayed on the touch screen. For example, the user may perform an initialization action at an arbitrary location on the touch screen and then begin "typing" within an area on the touch screen associated with the arbitrary location in order to enter text or other data entry commands.

In some examples, the methods and systems described herein may be customized for a particular user. For example, the methods and systems described herein may recognize the particular user providing the data entry commands and adjust the manner in which the data entry commands are recognized and/or interpreted. To illustrate, the methods and systems described herein may recognize that a particular user is interacting with a touch screen, determine a size of the user's hands (e.g., a relative distance between the various human input elements that are a part of the user's hands), and recognize data entry commands provided by the user in accordance with determined hand sizes.

The methods and systems described herein may be further configured to allow a user to customize how one or more data entry commands are to be provided by way of a touch screen. For example, as will be described below, a user may selectively associate different "tapping actions" with different characters, words, phrases, symbols, and/or any other type of data input command. In this manner, the methods and systems described herein may prevent unauthorized users from entering intelligible data by way of a touch screen associated with a particular computing device, thereby enhancing security of the computing device.

The methods and systems described herein may be further configured to allow a user to use the same data entry technique across multiple computing devices. For example, a service provider subsystem (e.g., one or more servers or other computing devices associated with a service provider, such as a network service provider) may be configured to maintain (e.g., in a network "cloud") relationship data customized for a particular user. As will be described below, the relationship data may define a relationship between a plurality of tapping actions that may be performed by the user and a plurality of data entry commands. The centrally maintained relationship data may allow the user to provide data entry commands to any appropriately configured computing device communicatively coupled to the service provider subsystem by way of any platform-specific network. For example, the service provider subsystem may detect that the particular user is interacting with a touch screen of a computing device communicatively coupled to the service provider subsystem by way of a network, detect one or more tapping actions performed on the touch screen by the user, and identify one or more data entry commands associated with the one or more tapping actions based on a relative position of each of the one or more tapping actions with respect to one or more reference positions on the touch screen and in accordance with the maintained relationship data.

As used herein, an "extremity" of a user refers to a hand or a foot of the user. A "human input element" that is a part of an extremity refers to any part of the hand or foot that may be used to tap (i.e., touch) a touch screen and thereby provide data entry commands. Exemplary human input elements that may be a part of a hand include the fingers, the palm, a lateral side of the hand, and a medial side of the hand. Exemplary human input elements that may be a part of the foot include the toes, the heel, the ball of the foot, and the lateral side of the foot. It will be recognized that, in some situations, the hands and/or feet may be bare (i.e., uncovered) while tapping a touch screen. Alternatively, the hands and/or feet may be covered (e.g., clothed with gloves, socks, and/or shoes) while tapping the touch screen.

As used herein, a "tapping action" refers to any contact made with a touch screen that may be used to provide a particular data entry command. For example, a tapping action may include, but is not limited to, a touching of a touch screen by one or more human input elements (either concurrently or sequentially), a "swiping" along a portion of the touch screen, and/or any other contact with the touch screen as may serve a particular implementation. A tapping action may have any suitable time duration as may serve a particular implementation.

FIG. 1 illustrates an exemplary data entry system 100. As will be described in more detail below, data entry system 100 may be configured to facilitate data entry by a user by way of a touch screen. Data entry system 100 may include, but is not limited to, a detection facility 102, a data entry management facility 104, and a storage facility 106, which may be in communication with one another using any suitable communication technologies. Each of these facilities will now be described.

Detection facility 102 may be configured to detect an initialization action performed by one or more extremities of a user. The initialization action may be performed by one or both hands of the user and/or one or both feet of the user and may include a touching of one or more arbitrary locations on a touch screen by each of the one or more extremities of the user. To illustrate, if the user is going to input data entry commands using both of his or her hands, the initialization action may include a touching of a first arbitrary location on the touch screen by the left hand of the user and a touching of a second arbitrary location on the touch screen by the right hand of the user. The touching of the touch screen by the hands may be performed concurrently or sequentially as may serve a particular implementation. Moreover, as will be described below, the touching of the touch screen may be performed by one or more human input elements that are a part of each hand. It will be recognized that other input scenarios using other combinations of the hands and/or feet may involve a touching of one or more arbitrary locations on one or more touch screens by the hands and/or feet as may serve a particular implementation.

Detection facility 102 may be further configured to detect one or more tapping actions performed on the touch screen by one or more human input elements that are a part of the hands and/or feet. As will be described below, the one or more tapping actions may be representative of one or more data entry commands. Detection facility 102 may detect the one or more tapping actions using any suitable touch detection heuristic as may serve a particular implementation.

In some examples, detection facility 102 may be further configured to detect that a particular user is interacting with a touch screen of a computing device. In this manner, as will be described in more detail below, data entry system 100 may appropriately identify one or more data entry commands in accordance with relationship data that has been customized for the particular user and/or a user profile associated with the particular user. Detection facility 102 may detect that a particular user is interacting with a touch screen in any suitable manner. For example, the user may "log on" to the computing device and/or data entry system 100, thereby providing identifying information to detection facility 102. Additionally or alternatively, detection facility 102 may utilize one or more biometric detection heuristics and/or any other suitable heuristic to identify the user.

Data entry management facility 104 may be configured to perform one or more data entry recognition, identification, and/or processing operations associated with touch input provided by a user by way of one or more touch screens. For example, continuing with the scenario in which the user inputs data entry commands using both of his or her hands, data entry management facility 104 may designate the first arbitrary location touched by the left hand as a first reference position associated with the left hand and the second arbitrary location touched by the right hand as a second reference position associated with the right hand. Subsequently, data entry management facility 104 may determine a relative position on the touch screen of each of one or more tapping actions with respect to the first and second reference positions and identify one or more data entry commands associated with the one or more tapping actions based on the relative position of each of the one or more tapping actions with respect to the first and second reference positions.

In some examples, data entry management facility 104 may be configured to identify the one or more data entry commands by utilizing relationship data that defines a relationship between one or more tapping actions and one or more data entry commands. For example, as will be described below, the relationship data may be in the form of a look up table that lists various tapping actions along with their associated data entry commands. As will be described below, the relationship data may be customized to the user. In other words, the user may selectively associate a particular tapping action with a particular data input command.

In some cases, the one or more data entry commands identified by data entry management facility 104 may be representative of one or more text characters. In such instances, data entry management facility 104 may be further configured to display the one or more text characters. For example, the one or more text characters may be displayed in real-time within a text field, document, etc. displayed on the touch screen as the user performs the one or more tapping actions. Alternatively, data entry management facility 104 may be configured to direct the touch screen to not display anything while the one or more tapping actions are performed. For example, data entry management facility 104 may be configured to cause the entire touch screen to be blank while the one or more tapping actions are performed. In this manner, power supplying the touch screen may be conserved and/or privacy may be maintained while the user provides the one or more data entry commands.

Data entry management facility 104 may be further configured to perform a training procedure configured to determine one or more characteristics and/or preferences of a user before the user begins entering data entry commands with his or her hands or feet. For example, the training procedure may determine a size of the user's hands (e.g., by determining a relative distance between each of the human input elements that are a part of the left hand and/or a relative distance between each of the human input elements that are a part of the right hand) and/or feet (e.g., by determining a relative distance between each of the human input elements that are a part of the left foot and/or a relative distance between each of the human input elements that are a part of the right foot). These size determinations may be made in any suitable manner. For example, with respect to the hands, the user may concurrently place his or her palms and fingers on the touch screen in a typing position. Data entry management facility 104 may determine a position of each of the palms and fingers on the touch screen and determined the relative distances accordingly. The training procedure may be further configured to determine customized relationship data as described above and/or any other characteristic and/or preference of the user as may serve a particular implementation.

Storage facility 106 may be configured to maintain relationship data 108, which defines a relationship between one or more tapping actions and one or more data entry commands. In some examples, storage facility 106 may maintain a unique set of relationship data for each of a plurality of users. For example, storage facility 106 may be implemented by a server associated with a service provider and configured to maintain relationship data associated with a plurality of customers of the service provider. In some examples, relationship data 108 may be maintained in the form of a look up table and/or in any other form as may serve a particular implementation.

Storage facility 106 may be further configured to maintain user profile data 110, which may be representative of one or more user profiles associated with one or more users of one or more computing devices. Storage facility 106 may maintain additional or alternative data as may serve a particular implementation.

In some examples, data entry system 100 may be implemented by any suitable computing device including or associated with a touch screen. For example, data entry system 100 may be implemented by a personal computer connected to a touch screen monitor, a tablet computer, a mobile phone, a personal digital assistant, a portable media player, a gaming device, and/or any other type of computing device as may serve a particular implementation.

Figure 2:
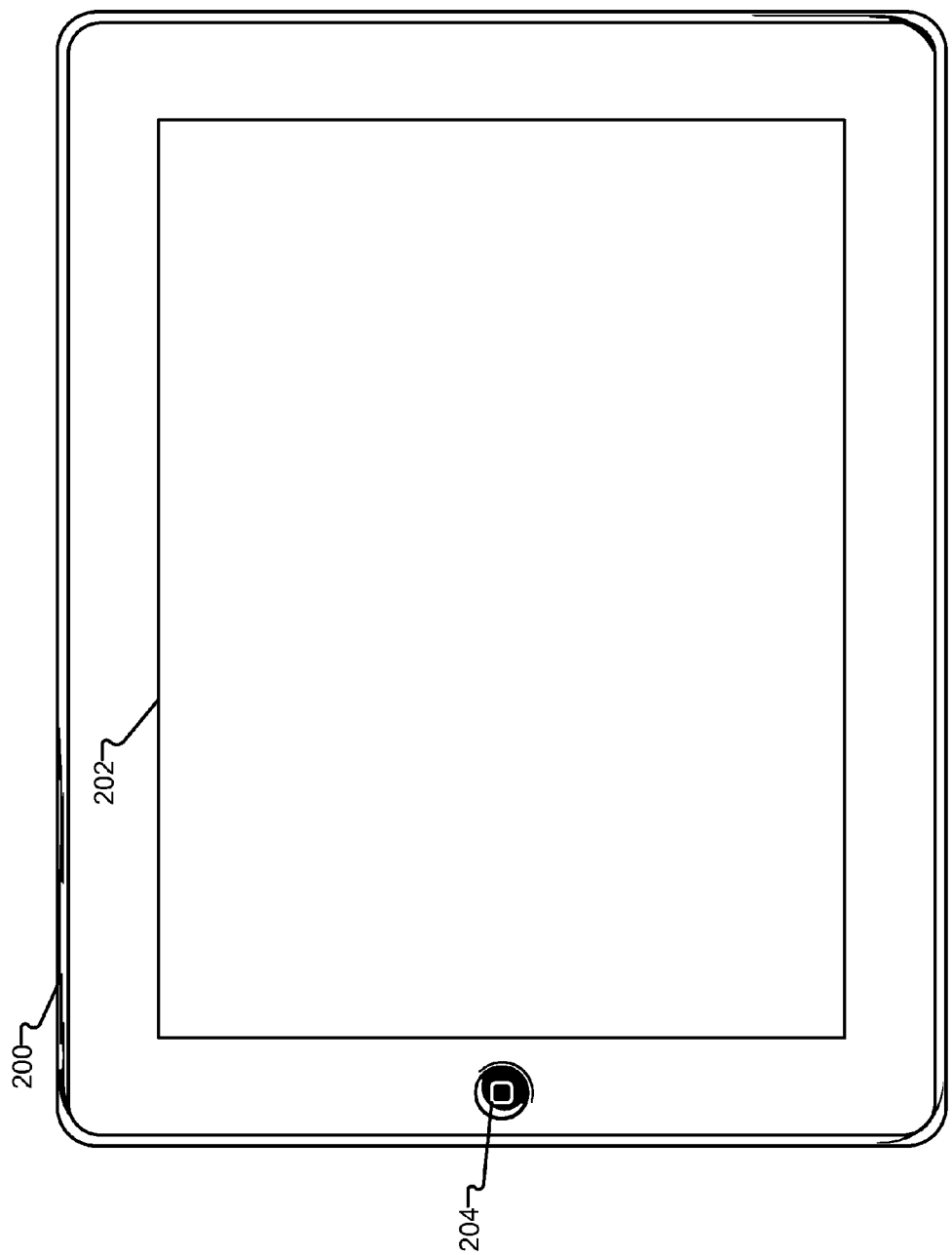
FIG. 2 shows an exemplary tablet computer according to principles described herein.

To illustrate, FIG. 2 shows an exemplary tablet computer 200 that may implement data entry system 100. As shown, tablet computer 200 may include a touch screen 202 and/or one or more input buttons (e.g., input button 204). In some examples, tablet computer 200 may be configured to present (e.g., display) text, images, and/or other content by way of touch screen 202. A user may interact with such content and/or provide one or more data entry commands by way of touch screen 202.

Additionally or alternatively, as will be described in more detail below, data entry system 100 may be implemented by a service provider subsystem communicatively coupled to one or more touch screen computing devices by way of one or more platform-specific networks. In this manner, a user may provide data entry commands to any of the touch screen computing devices communicatively coupled to the service provider subsystem without the computing devices needing to locally store relationship data and/or user profile data associated with the user.

Figure 3:
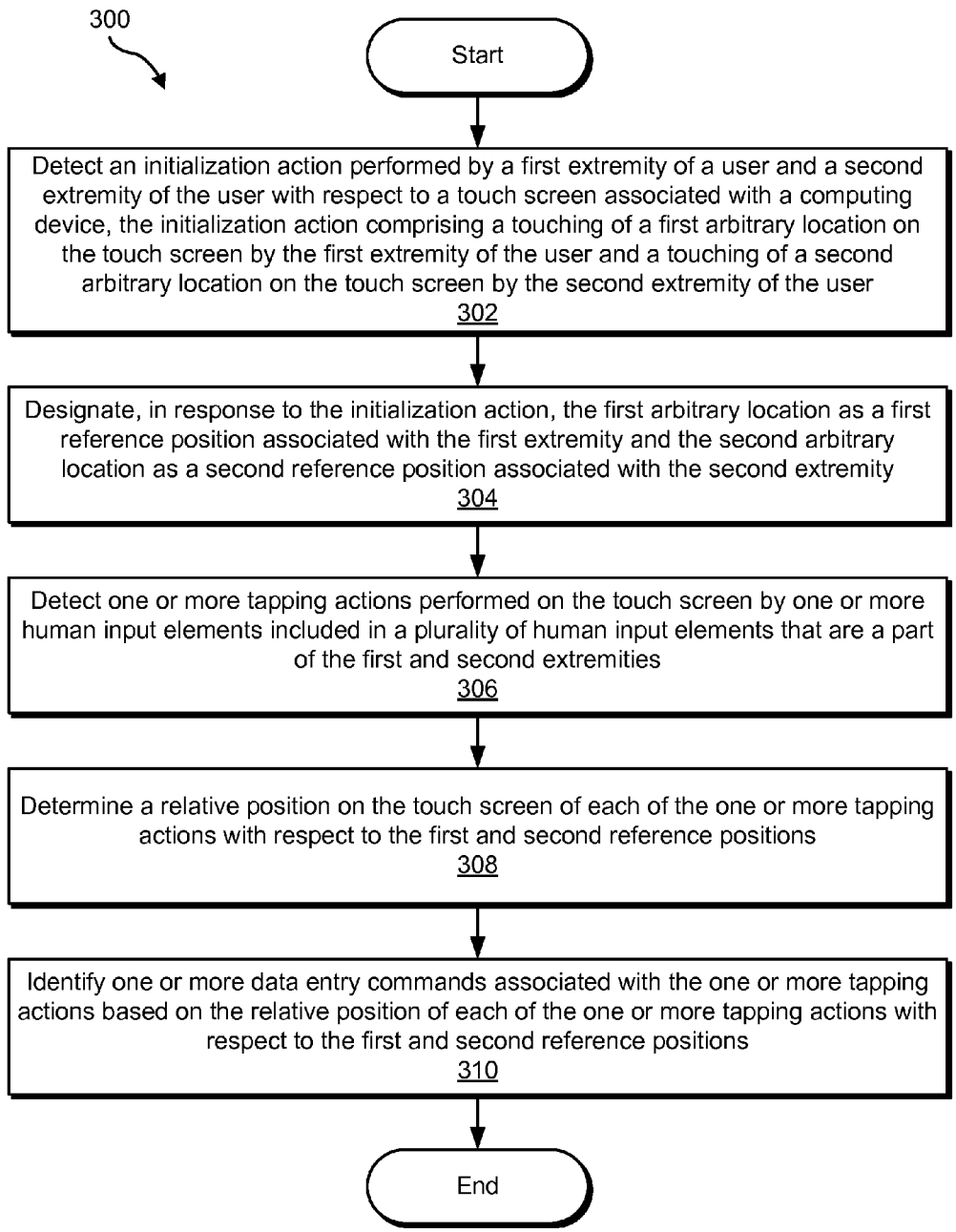
FIG. 3 illustrates an exemplary method of facilitating data entry by way of a touch screen according to principles described herein.

FIG. 3 illustrates an exemplary method 300 of facilitating data entry by way of a touch screen. While FIG. 3 illustrates exemplary steps according to one embodiment, other embodiments may omit, add to, reorder, and/or modify any of the steps shown in FIG. 3. One or more of the steps shown in FIG. 3 may be performed by any component or combination of components of data entry system 100, which, as described above, may be implemented by a computing device that includes and/or is associated with the touch screen by which the data entry is input and/or a service provider subsystem.

In step 302, an initialization action performed by a first extremity of a user and a second extremity of the user with respect to a touch screen associated with a computing device is detected. The initialization action may include a touching of a first arbitrary location on the touch screen by the first extremity of the user and a touching of a second arbitrary location on the touch screen by the second extremity of the user. The initialization action may include any other action as may serve a particular implementation.

In step 304, in response to the initialization action, the first arbitrary location is designated as a first reference position associated with the first extremity and the second arbitrary location is designated as a second reference position associated with the second extremity. The first and second arbitrary locations may be designated as the first and second reference positions, respectively, in any suitable manner as may serve a particular implementation.

In step 306, one or more tapping actions performed on the touch screen by one or more human input elements included in a plurality of human input elements that are a part of the first and second extremities are detected. The one or more tapping actions may be detected in any suitable manner as may serve a particular implementation.

In step 308, a relative position on the touch screen of each of the one or more tapping actions is determined with respect to the first and second reference positions. The relative position of each of the one or more tapping actions may be determined in any suitable manner as may serve a particular implementation.

In step 310, one or more data entry commands associated with the one or more tapping actions are identified based on the relative position of each of the one or more tapping actions with respect to the first and second reference positions. The one or more data entry commands may be identified in any suitable manner as may serve a particular implementation.

An example of method 300 will now be given in connection with FIGS. 4-14. It will be assumed in this example that the first extremity of the user is the user's left hand and the second extremity of the user is the user's right hand. It will be recognized that the example is merely illustrative of the many different implementations of method 300 that may be realized in accordance with the methods and systems described herein.

Figure 4:
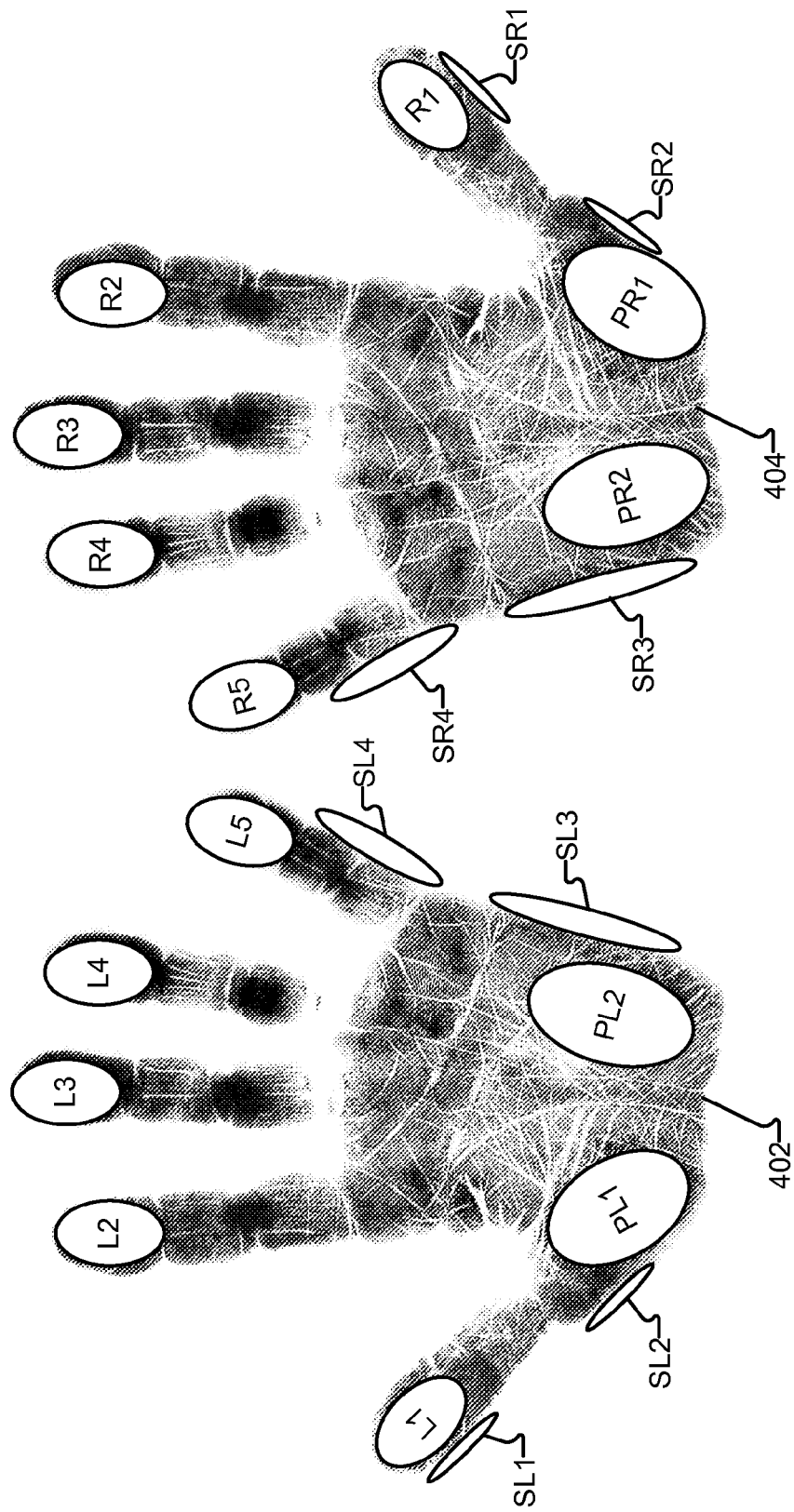
FIG. 4 illustrates various human input elements that may be a part of a user's left and right hands according to principles described herein.

FIG. 4 illustrates various human input elements that may be a part of a user's left hand 402 and the user's right hand 404. As shown, each hand 402 and 404 includes the following human input elements: a thumb (L1 and R1), an index finger (L2 and R2), a middle finger (L3 and R3), a ring finger (L4 and R4), a little finger (L5 and R5), a medial palm portion (PL1 and PR1), a lateral palm portion (PL2 and PR2), first and second medial side portions (SL3, SL2, SR1, and SR2), and first and second lateral side portions (SL3, SL4, SR3, and SR4). As will be illustrated below, each human input element may be used to perform one or more tapping actions on a touch screen in order to provide one or more data entry commands.

Figure 5:
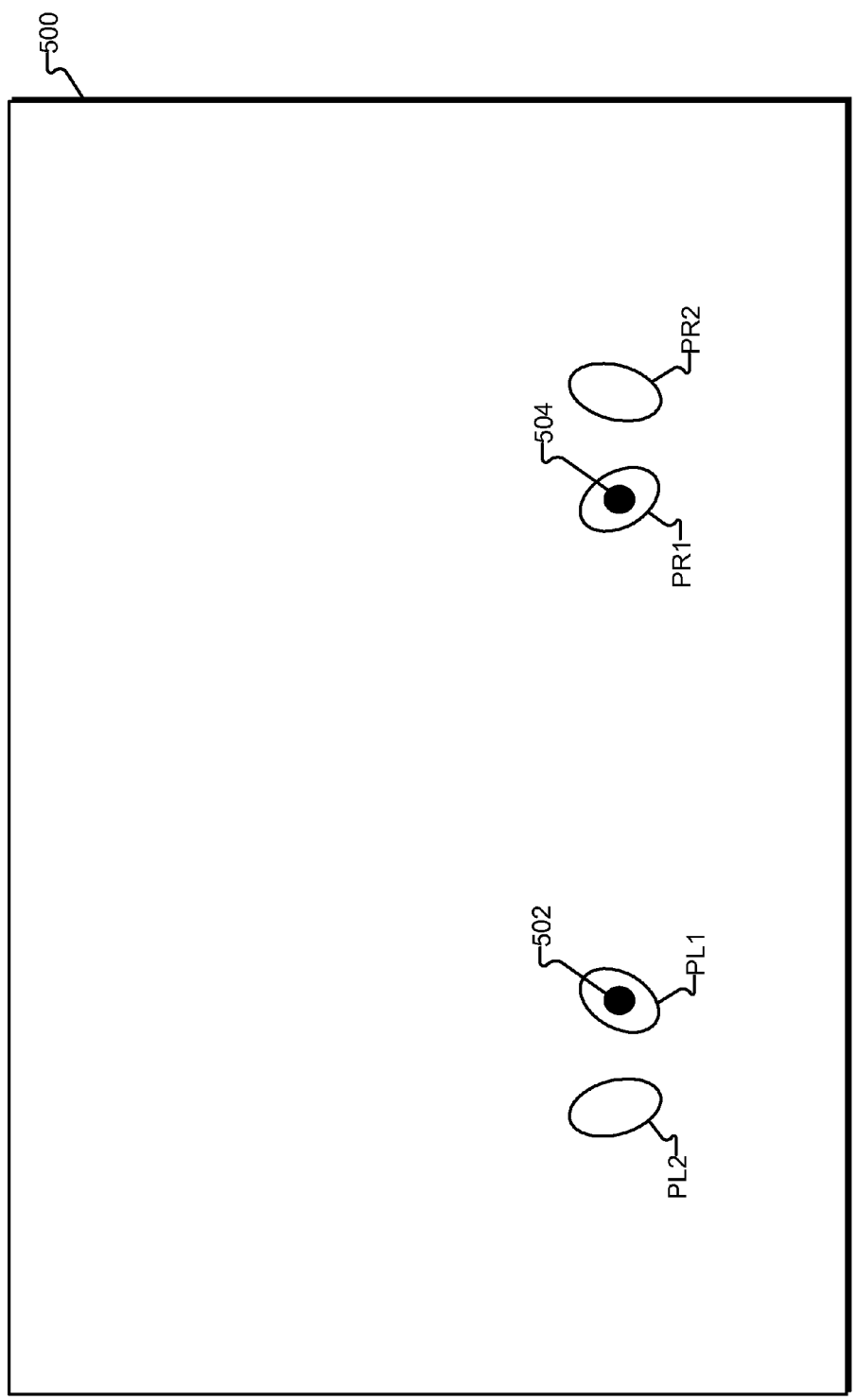
FIG. 5 illustrates an exemplary initialization action that may be performed by a user with respect to a touch screen according to principles described herein.

FIG. 5 illustrates an exemplary initialization action that may be performed by a user with respect to a touch screen 500. As shown, to perform the initialization action, the user may touch arbitrary locations on touch screen 500 with both portions of both of his or her palms (i.e., PL1, PL2, PR1, and PR2). In some examples, the user may touch the touch screen 500 with both palms concurrently. Alternatively, the user may sequentially touch the touch screen 500 with one palm followed by the other.

The initialization action illustrated in FIG. 5 is merely illustrative of the many different types of initialization actions that may be performed by a user to indicate to data entry system 100 that he or she is going to begin entering one or more data entry commands. Alternative initialization actions include, but are not limited to, the user concurrently touching the touch screen 500 with all of his or her fingers, all of his or her fingers and both of his or her palms, and/or any other combination of human input elements as may serve a particular implementation.

The initialization action may be performed at practically any arbitrary location on touch screen 500. In this manner, the user is not tied to providing data entry commands by way of a pre-designated portion of the touch screen 500. However, it will be recognized that an initialization action performed at some locations on touch screen 500 may not result in the user subsequently having sufficient room to provide data entry commands. For example, if a user performs an initialization action by touching the touch screen 500 with his or her palms at or near a top edge of the touch screen 500, the user will subsequently not have room to provide data entry commands using his or her fingers. Hence, in some examples, data entry system 100 may be configured to determine whether a location associated with a particular initialization action that has been performed will leave the user with sufficient space on touch screen 500 to subsequently provide data entry commands. If data entry system 100 determines that there will not be enough space, data entry system 100 may ignore the initialization action, notify the user that the initialization action is not valid, and/or take any other suitable action as may serve a particular implementation.

As mentioned, the arbitrary locations touched by the hands of the user during the initialization action may be designated by data entry system 100 as reference positions to which locations of subsequent tapping actions are compared. For example, if the user touches the touch screen 500 with both portions of both of his or her palms, as shown in FIG. 5, any portion of the touch screen 500 touched by the left palm may be designated as a first reference position associated with the left hand and any portion of the touch screen 500 touched by the right palm may be designated as a second reference position associated with the right hand. To illustrate, dot 502 represents a location on touch screen 500 that has been designated as a reference position associated with the left hand and dot 504 represents a location on touch screen 500 that has been designated as a reference position associated with the right hand.

In some alternative examples, multiple reference positions may be designated for each hand. For example, a reference position associated with each human input element associated with each hand may be designated if each of the human input elements touch the touch screen 500 during the initialization action. However, for purposes of this example, a single reference position is associated with each hand.

After the initialization action has been performed, and after the reference positions associated with the hands have been designated, the user may perform one or more tapping actions on touch screen 500 to enter one or more data entry commands. Data entry system 100 may detect each tapping action, determine a relative position on touch screen 500 of each tapping action with respect to reference positions 502 and/or 504, and identify the particular data entry command associated with each tapping action based on the relative position of each tapping action with respect to reference positions 502 and/or 504.

Figure 6:
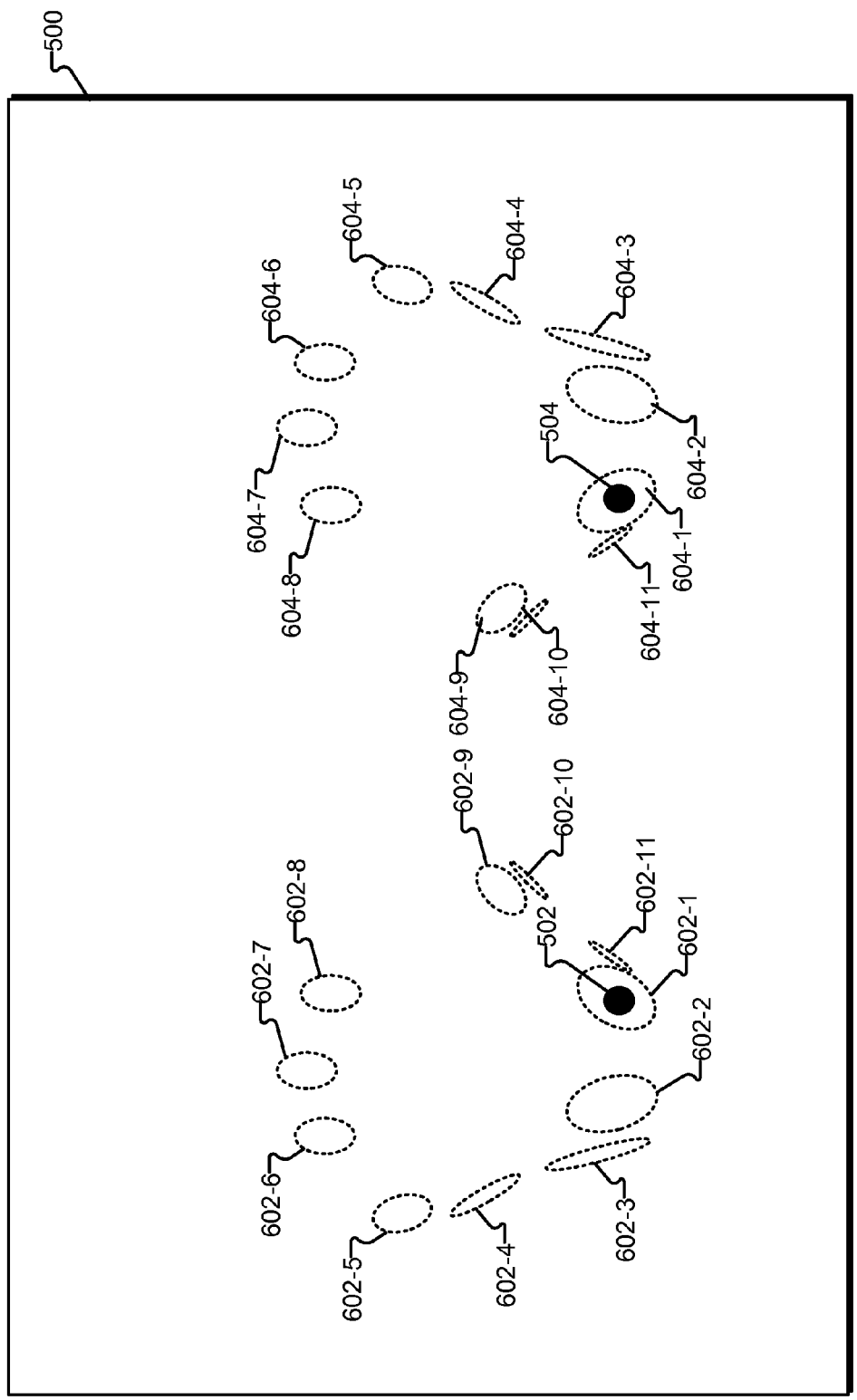
FIG. 6 shows a plurality of detection zones on a touch screen that are each associated with a particular human input element of the left and right hands of a user according to principles described herein.

To illustrate, FIG. 6 shows detection zones on touch screen 500 that are each associated with a particular human input element of the left and right hands. For example, FIG. 6 shows detection zones 602-1 through 602-11 (collectively "detection zones 602") as being associated with human input elements of the left hand and detection zones 604-1 through 604-11 (collectively "detection zones 604") as being associated with human input elements of the right hand.

A position of each of detection zones 602 and 604 on touch screen 500 may be determined by data entry system 100 based on the determined reference positions 502 and 504 and on the size of the user's hands (which, as described previously, may be determined in one or more training procedures). Subsequently, when data entry system 100 detects a tapping action within a particular detection zone, data entry system 100 may determine that the tapping action was performed by a human input element associated with the particular detection zone. For example, data entry system 100 may detect a tapping action performed within detection zone 602-8 and determine that the tapping action was performed by a left index finger of the user.

The size of each of detection zones 602 and 604 may be set in accordance with any suitable heuristic. For example, detection zones associated with commonly used human input elements (e.g., the fingers) may be relatively larger than those associated with other human input elements (e.g., one or more sides of the hand). In some examples, data entry system 100 may employ one or more prediction heuristics to determine which human input element is associated with a particular tapping action performed at or near a boundary between neighboring detection zones (e.g., detection zones 602-7 and 602-8).

As mentioned, data entry system 100 may maintain or otherwise access relationship data defining a relationship between a plurality of different tapping actions and a plurality of different data entry commands. To illustrate, FIG. 7 shows a look up table 700 that may be used by data entry system 100 to identify a particular data entry command associated with a detected tapping action. For example, table 700 shows that a tapping action that consists of a concurrent (or sequential) tapping by the left thumb (L1) and the right thumb (R1) represents the letter "a". Various other tapping actions and their associated data entry commands are shown in table 700.

In some examples, table 700 may be customized to a particular user. In other words, the user may specify certain associations between one or more tapping actions and one or more data entry commands. For example, a user may modify table 700 so that the tapping action consisting of a concurrent (or sequential) tapping by the left thumb (L1) and the right thumb (R1) represents something other than the letter "a." For example, this tapping action may be customized to represent a particular word or phrase (e.g., "sell"). In this manner, the user may enter the word or phrase simply by performing a single tapping action.

An example of inputting text in accordance with the relationship data defined in table 700 will now be given. FIG. 8 shows a web page 800 that may be displayed within touch screen 500. A user may desire to input text (e.g., the word "Help") into a text field 802 that is a part of web page 800. To this end, the user may select text field 802 (e.g., by placing a cursor within text field 802) and then perform an initialization action by touching the touch screen 500 with his or her palms, as described above and as illustrated in FIG. 9. The user may then begin inputting text by performing a sequence of tapping actions.

Figure 10:
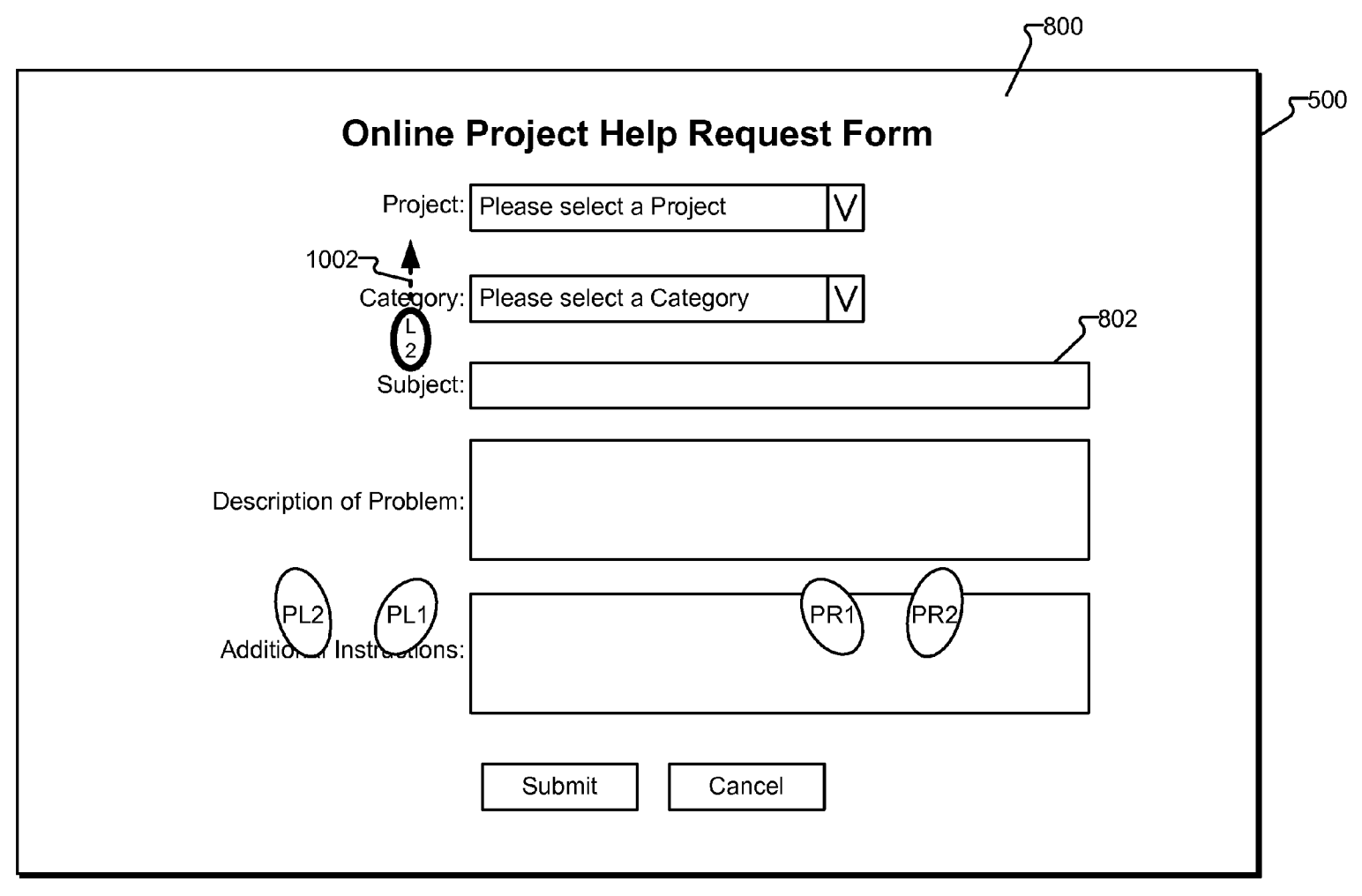

For example, FIG. 10 illustrates a first tapping action that may be used to input a data entry command of "shift" so that the first letter of the word to be input is capitalized. As illustrated by arrow 1002, the tapping action consists of the left index finger (L2) moving in an upward direction along the surface of touch screen 500.

Figure 11:
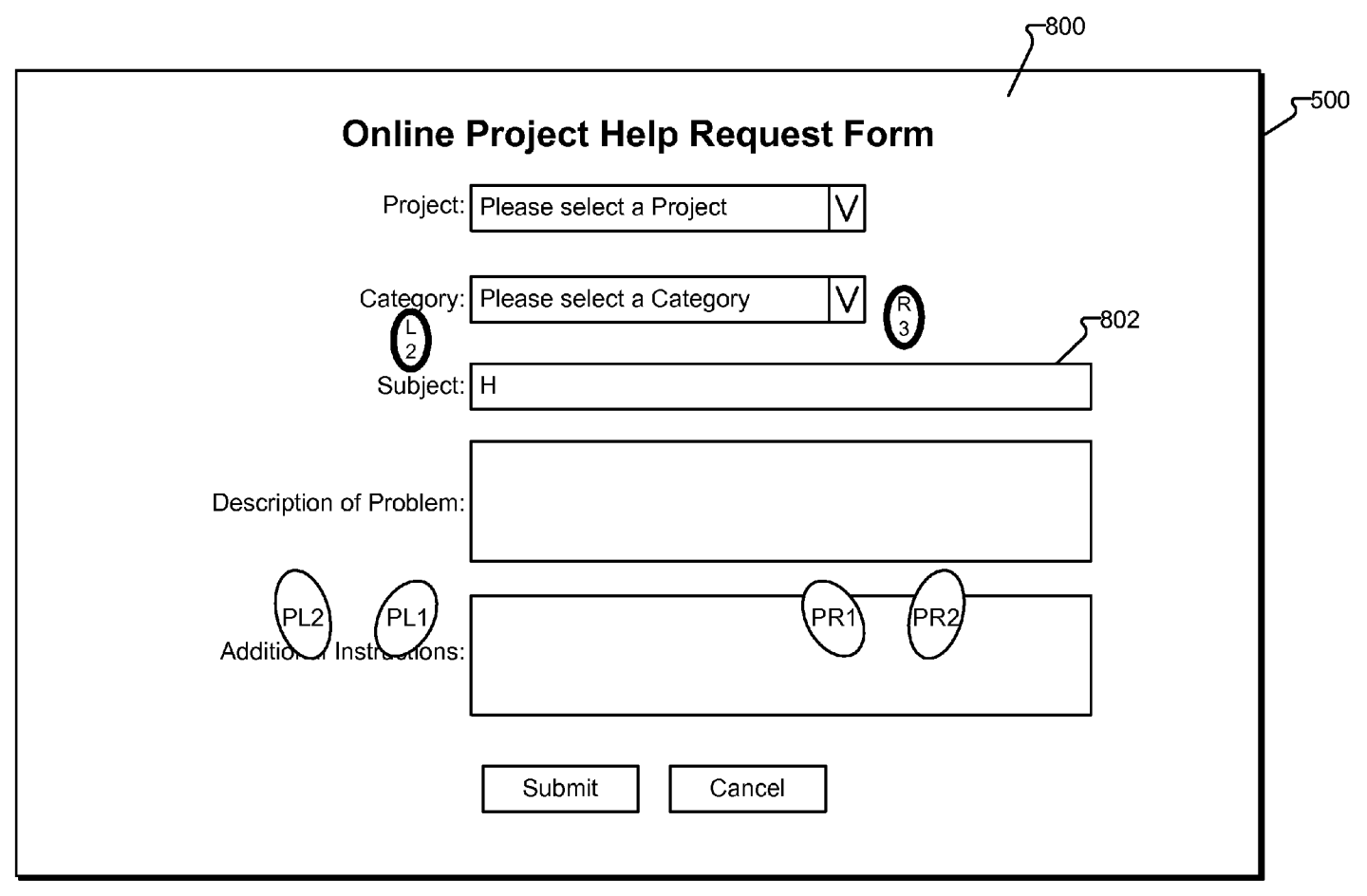

Next, as shown in FIG. 11, the use may input an "H" by concurrently (or, in some alternative embodiments, sequentially) touching the touch screen 500 with the left index finger (L2) and the right middle finger (R3). As shown, the letter "H" may be displayed within text field 802 in response to this tapping action.

Next, as shown in FIG. 12, the user may input an "e" by concurrently (or, in some alternative embodiments, sequentially) touching the touch screen 500 with the left thumb (L1) and the right little finger (R5). As shown, the letter "e" may be displayed within text field 802 in response to this tapping action.

Next, as shown in FIG. 13, the user may input an "l" by concurrently (or, in some alternative embodiments, sequentially) touching the touch screen 500 with the left middle finger (L3) and the right index finger (R2). As shown, the letter "l" may be displayed within text field 802 in response to this tapping action.

Figure 14:
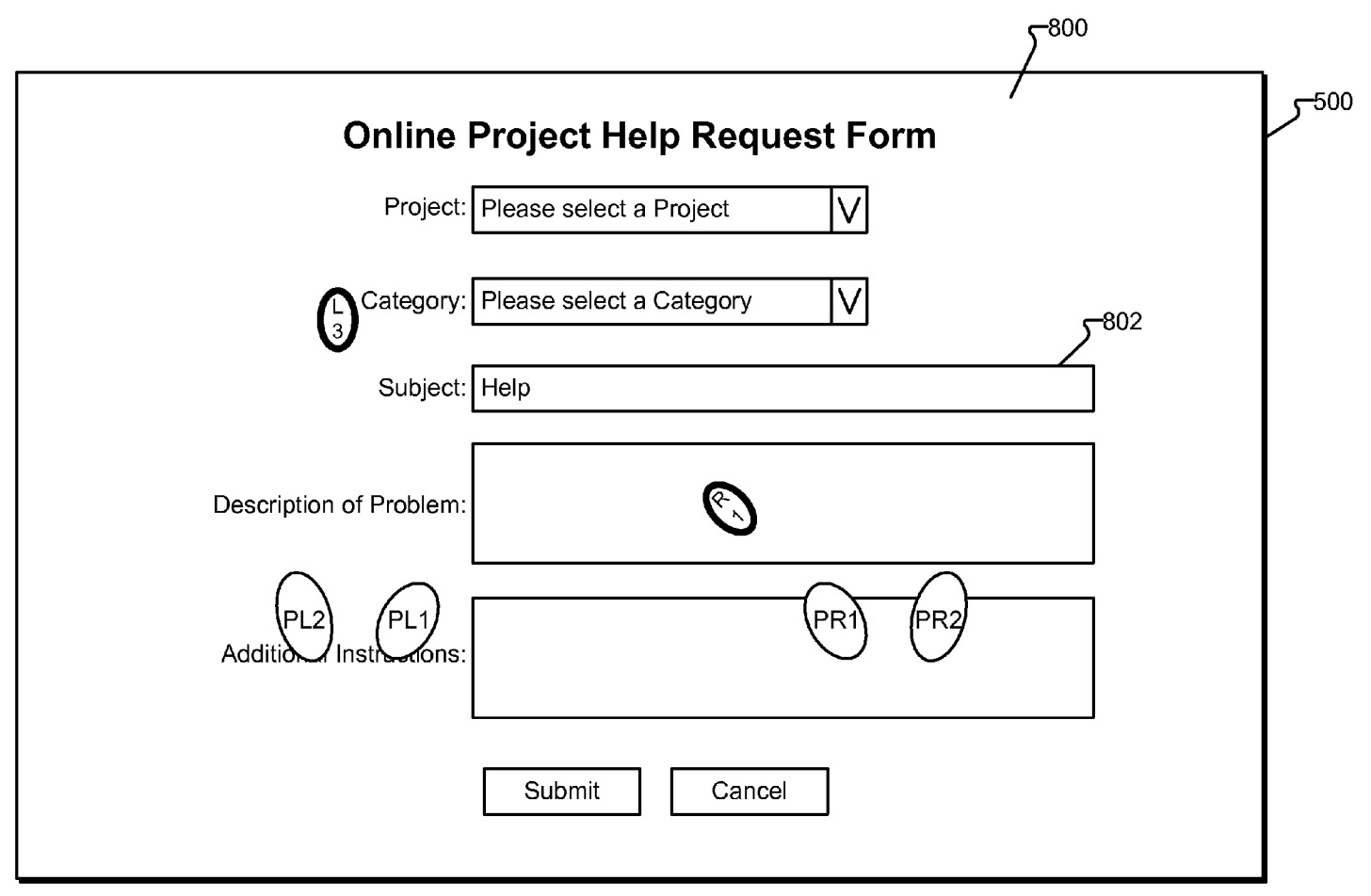

Next, as shown in FIG. 14, the user may input a "p" by concurrently (or, in some alternative embodiments, sequentially) touching the touch screen 500 with the left middle finger (L3) and the right thumb (R1). As shown, the letter "p" may be displayed within text field 802 in response to this tapping action.

As shown in FIGS. 10-14, the tapping actions may be performed while the palm portions (e.g., palm portions PL1, PL2, PR1, and PR2) maintain contact with touch screen 500. Alternatively, a user may be required to lift his or her palms off of touch screen 500 while the tapping actions are performed.

As also shown in FIGS. 10-14, the tapping actions may be performed while the web page 800 is displayed on touch screen 500. Alternatively, data entry system 100 may direct the computing device to not display anything on touch screen 500 while the one or more tapping actions are performed. For example, a user may desire to input text without other people sitting near him or her being able to see what he or she is inputting. To this end, the user may select an option configured to direct touch screen 500 to be blank while the text is being input.

FIG. 15 illustrates an exemplary embodiment wherein data entry system 100 directs the computing device to display reference markers 1502 (e.g., reference markers 1502-1 and 1502-2) on touch screen 500. Reference markers 1502 may be configured to graphically indicate detection zones associated with human input elements that are a part of the user's hands. For example, reference marker 1502-1 graphically indicates detection zone 602-9 associated with the user's left thumb and reference marker 1502-2 graphically indicates detection zone 604-9 associated with the user's right thumb. In this manner, after the detection zones have been determined (i.e., after the user has performed the initialization action), the user may see where to place his or her hands to provide data entry commands. In some examples, an option may be provided that allows the user to selectively hide and display reference markers 1502.

Figure 16:
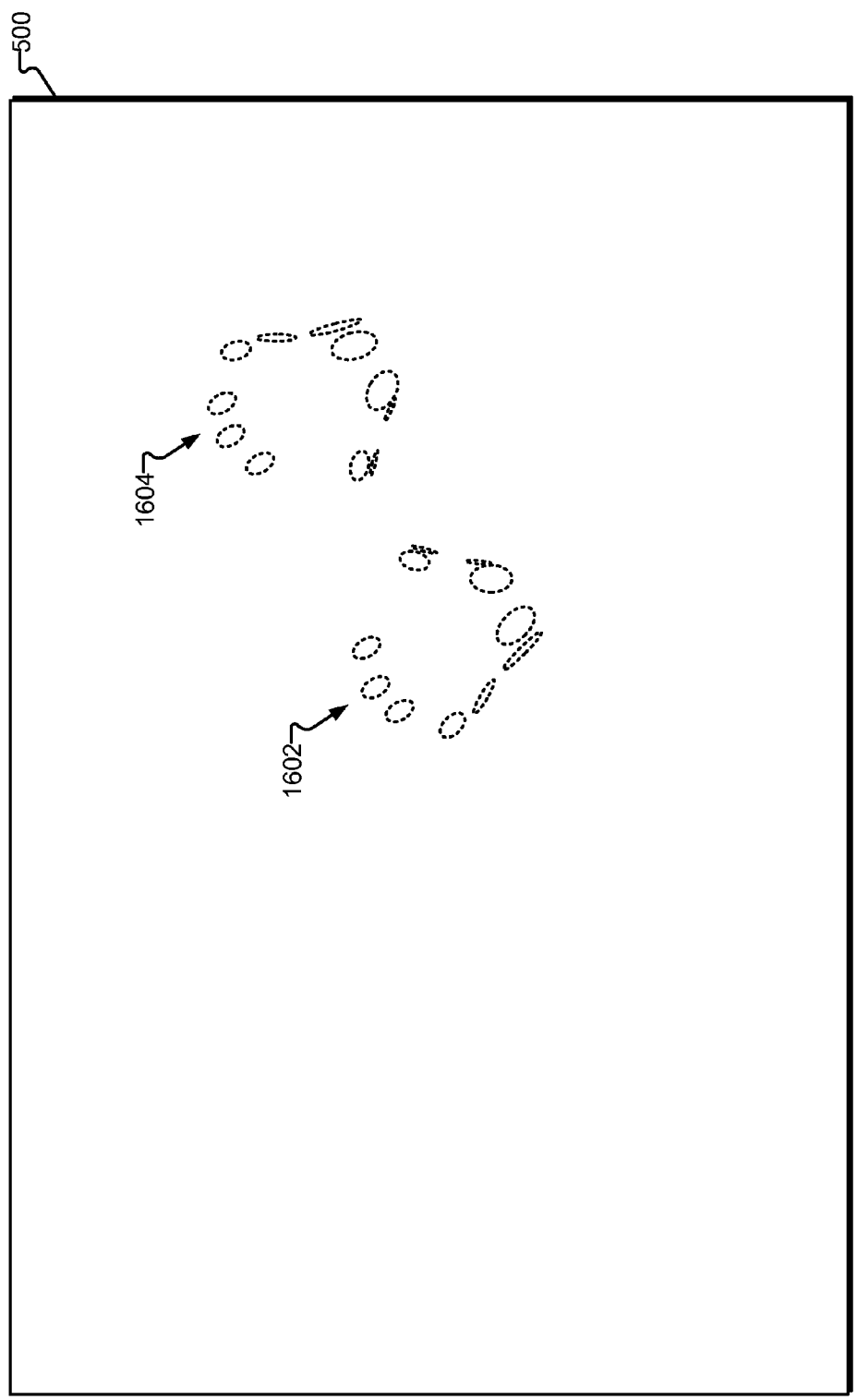
FIG. 16 shows updated detection zones after a new user with relatively small hands begins interacting with touch screen according to principles described herein.

In some examples, a computing device may be utilized by multiple users. For example, a computing device may be shared among members of a family, work group, etc. Each user may have a unique size of hands and utilize a unique set of relationship data. Hence, data entry system 100 may recognize when a different user begins interacting with touch screen 500 and automatically adjust a size and/or location of detection zones 602 and 604 in accordance with a user profile of the new user. Data entry system 100 may also begin using a different set of relationship data to identify data entry commands input by the new user. For example, FIG. 16 shows updated detection zones 1602 and 1604 after a new user with relatively smaller hands begins interacting with touch screen 500. As shown, updated detection zones 1602 and 1604 are smaller in size than detection zones 602 and 604 shown in FIG. 6. FIG. 16 also shows that detection zones 1602 and 1604 are located within a different region of touch screen 500 than that associated with detection zones 602 and 604. Data entry system 100 may detect that a new user has begun interacting with touch screen 500 in any suitable manner as may serve a particular implementation. For example, data entry system 100 may detect an input command provided by the new user indicating that the new user has begun interacting with touch screen 500.

Figure 17:
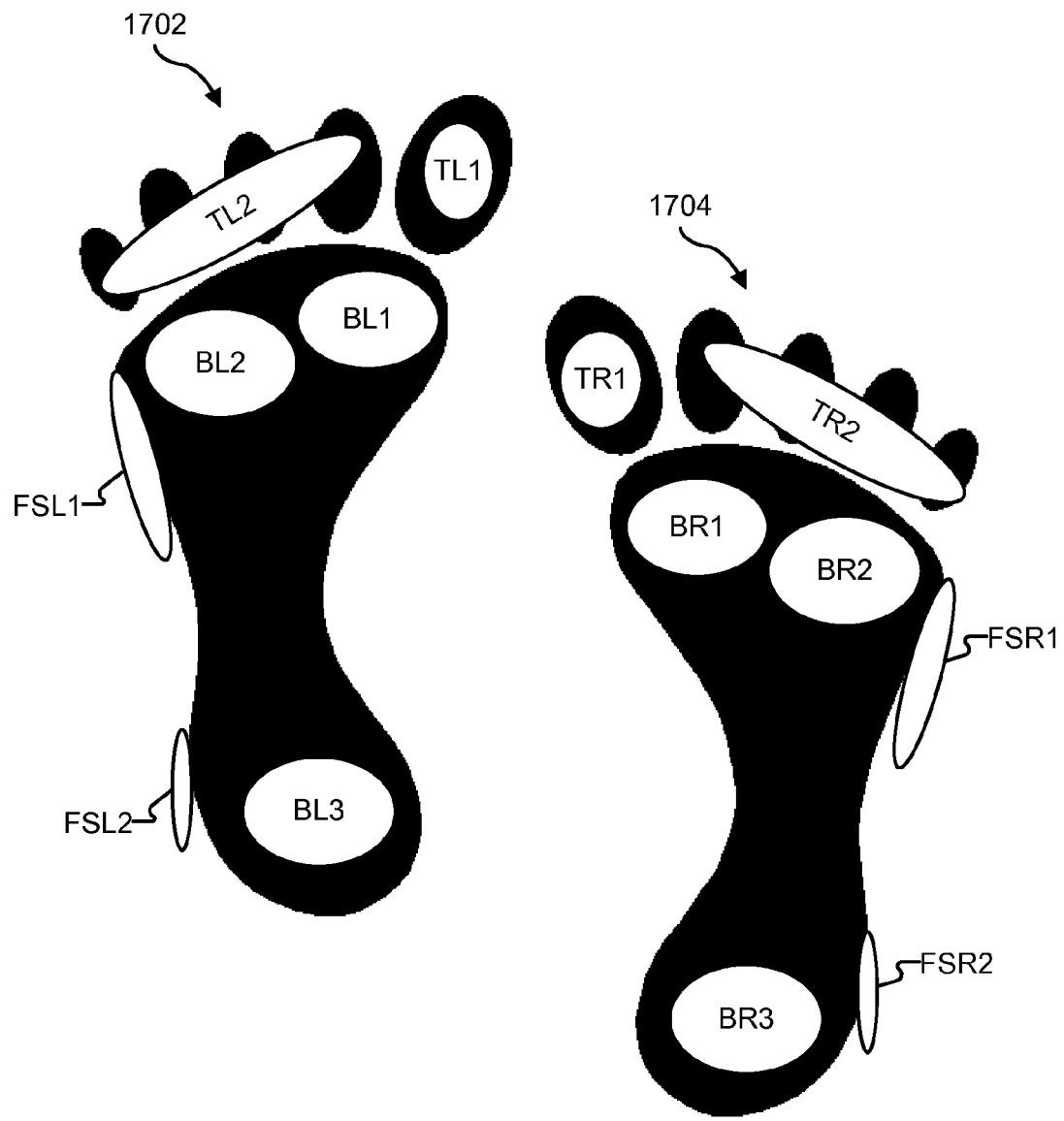
FIG. 17 illustrates various human input elements that may be a part of a user's left and right feet according to principles described herein.

In some alternative examples, a user may utilize one or both feet to provide one or more tapping actions in order to enter one or more data entry commands. FIG. 17 illustrates various human input elements that may be a part of a user's left foot 1702 and the user's right foot 1704. As shown, each foot 1702 and 1704 includes the following human input elements: a big toe (TL1 and TR1), a group of four remaining toes (TL2 and TR2), a medial ball portion (BL1 and BR1), a lateral ball portion (BL2 and BR2), a heel portion (BL3 and BR3), a first lateral side portion (FSL1 and FSR1), and a second lateral side portion (FSL2 and FSR2). In a similar manner as that described above with respect to the hands, each human input element of each foot may be used to perform one or more tapping actions on a touch screen in order to provide one or more data entry commands.

Figure 18:
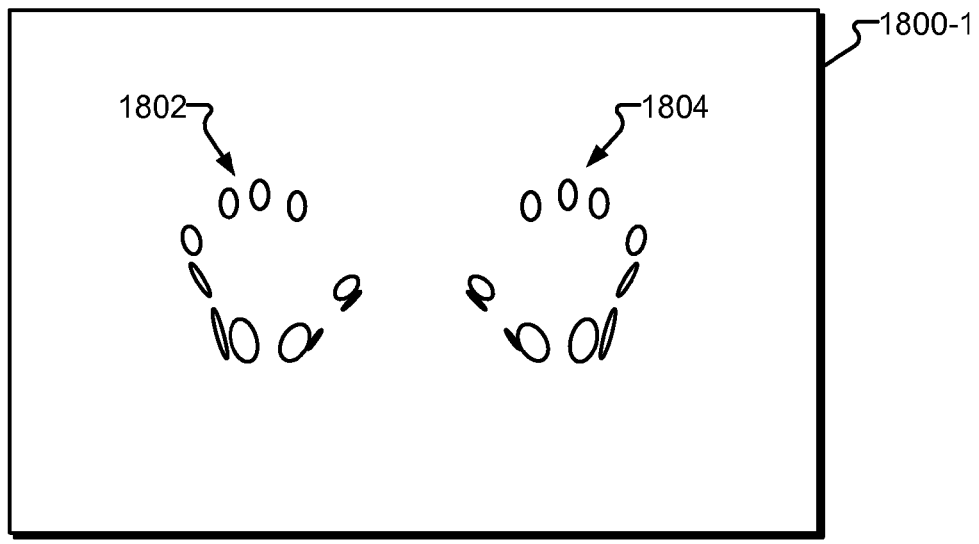
FIG. 18 illustrates an exemplary configuration wherein a first touch screen is used by one or more hands of a user and a second touch screen is concurrently used by one or more feet of the user according to principles described herein.
Figure 18:
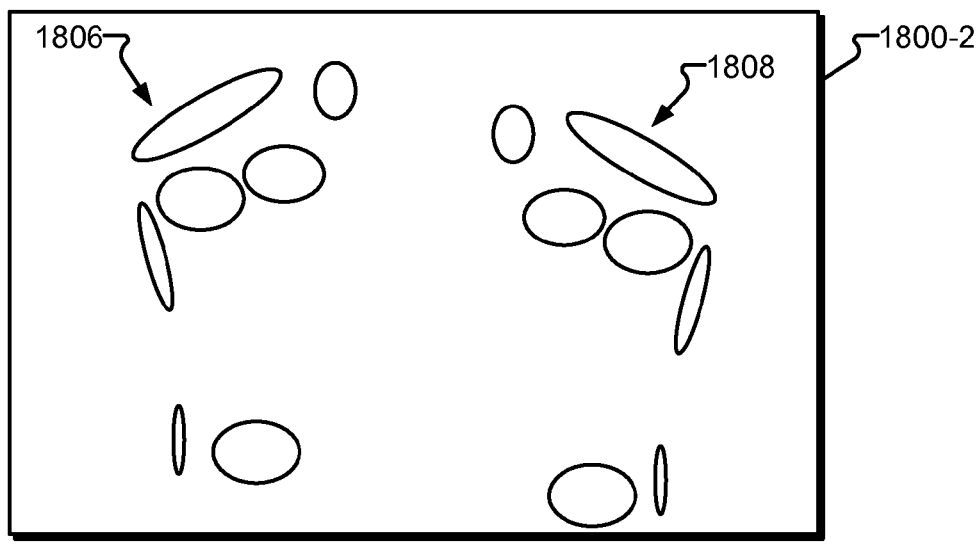

In some examples, multiple touch screens may be concurrently utilized by a user to provide one or more data entry commands. For example, FIG. 18 illustrates an exemplary configuration wherein a first touch screen 1800-1 is used by one or more hands of a user and a second touch screen 1800-2 is concurrently used by one or more feet of the user. Each touch screen 1800-1 and 1800-2 may be associated with the same computing device. Alternatively, touch screen 1800-1 may be associated with a first computing device and 1800-2 may be associated with a second computing device. In this case, the first and second computing devices may be configured to communicate one with another.

FIG. 18 further illustrates exemplary detection zones associated with each human input element that is a part of each hand and each foot of the user. For example, FIG. 18 shows detection zones 1802 as being associated with a left hand of the user, detection zones 1804 as being associated with a right hand of the user, detection zones 1806 as being associated with a left foot of the user, and detection zones 1808 as being associated with a right foot of the user.

Figure 19:
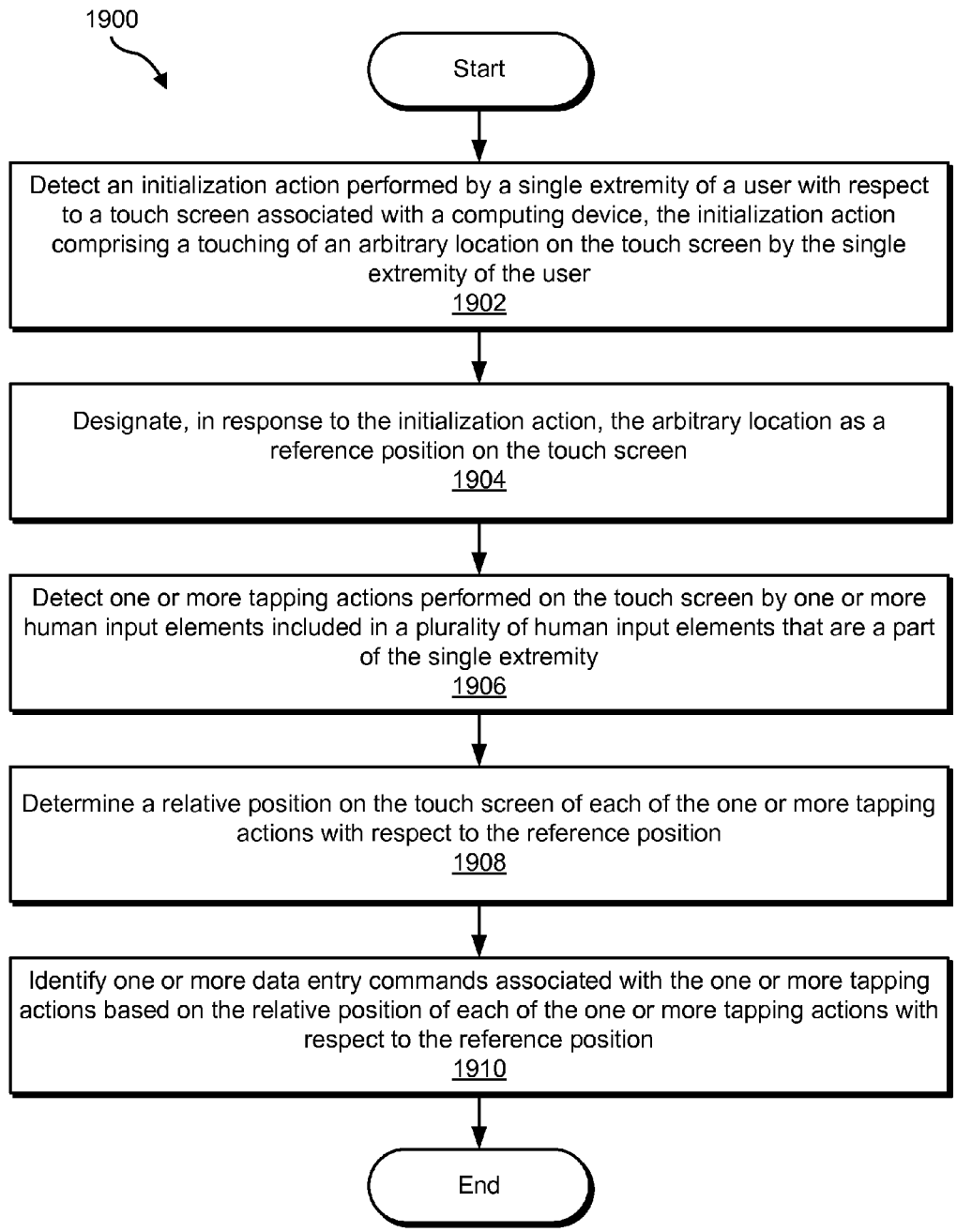
FIG. 19 illustrates another exemplary method of facilitating data entry by way of a touch screen according to principles described herein.

FIG. 19 illustrates another exemplary method 1900 of facilitating data entry by way of a touch screen. In method 1900, a single extremity (e.g., a hand or a foot) is used to provide one or more data entry commands. While FIG. 19 illustrates exemplary steps according to one embodiment, other embodiments may omit, add to, reorder, and/or modify any of the steps shown in FIG. 19. One or more of the steps shown in FIG. 19 may be performed by any component or combination of components of data entry system 100.

In step 1902, an initialization action performed by a single extremity of a user with respect to a touch screen associated with a computing device is detected. The initialization action may include a touching of arbitrary location on the touch screen by the single extremity of the user. Step 1902 may be performed in any of the ways described herein.

In step 1904, in response to the initialization action, the arbitrary location is designated as a reference position on the touch screen. Step 1904 may be performed in any of the ways described herein.

In step 1906, one or more tapping actions performed on the touch screen by one or more human input elements included in a plurality of human input elements that are a part of the single extremity are detected. Step 1906 may be performed in any of the ways described herein.

In step 1908, a relative position on the touch screen of each of the one or more tapping actions is determined with respect to the reference position. Step 1908 may be performed in any of the ways described herein.

In step 1910, one or more data entry commands associated with the one or more tapping actions are identified based on the relative position of each of the one or more tapping actions with respect to the reference position. Step 1910 may be performed in any of the ways described herein.

Figure 20:
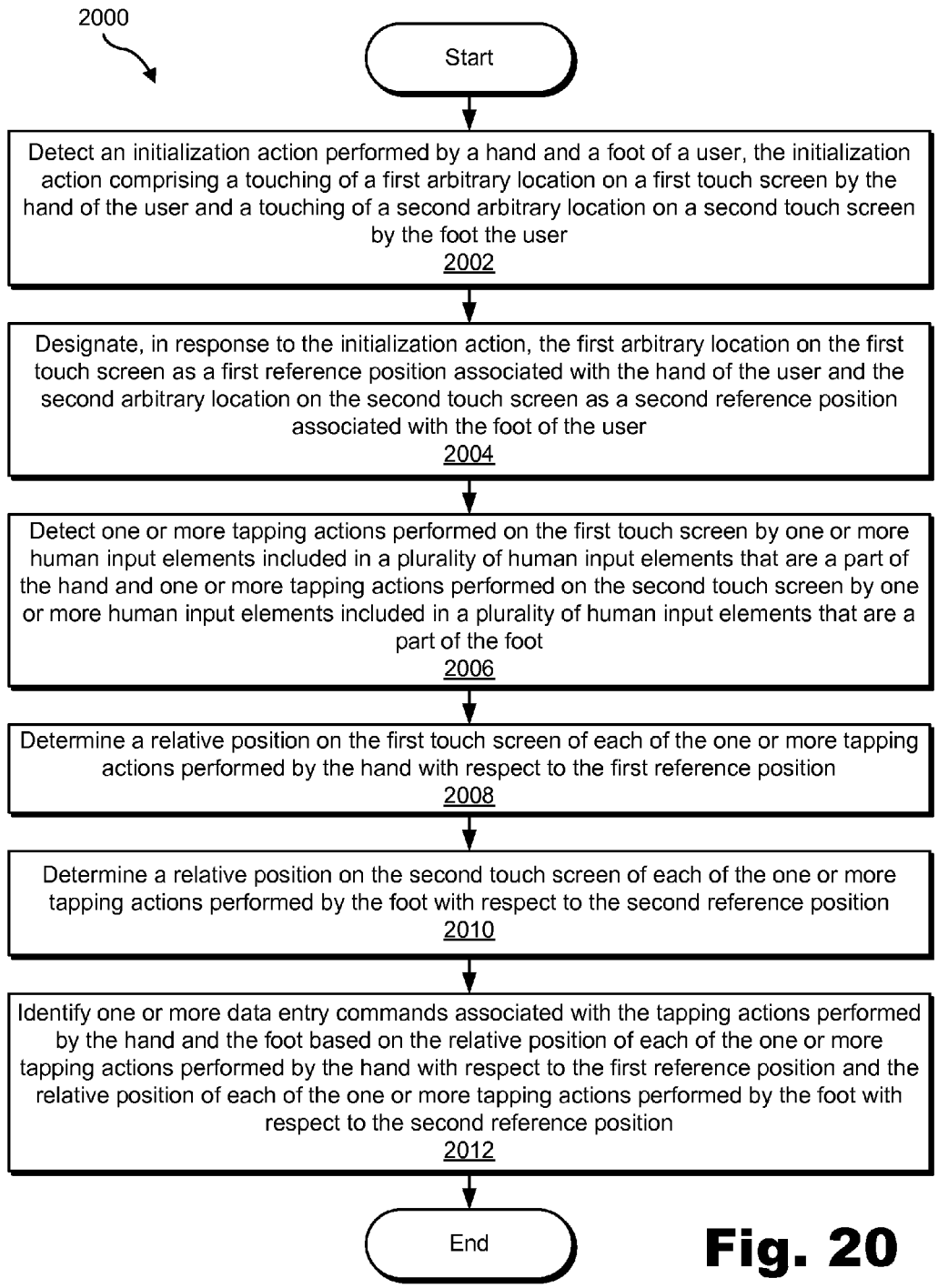
FIG. 20 illustrates another exemplary method of facilitating data entry by way of a touch screen according to principles described herein.

FIG. 20 illustrates another exemplary method 2000 of facilitating data entry by way of a touch screen. In method 2000, a hand and a foot are used to provide one or more data entry commands. While FIG. 20 illustrates exemplary steps according to one embodiment, other embodiments may omit, add to, reorder, and/or modify any of the steps shown in FIG. 20. One or more of the steps shown in FIG. 20 may be performed by any component or combination of components of data entry system 100.

In step 2002, an initialization action performed by a hand and a foot of a user is detected. The initialization action may include a touching of a first arbitrary location on a first touch screen by the hand of the user and a touching of a second arbitrary location on a second touch screen by the foot the user. Step 2002 may be performed in any of the ways described herein.

In step 2004, in response to the initialization action, the first arbitrary location on the first touch screen is designated as a first reference position associated with the hand of the user and the second arbitrary location on the second touch screen is designated as a second reference position associated with the foot of the user. Step 2004 may be performed in any of the ways described herein.

In step 2006, one or more tapping actions performed on the first touch screen by one or more human input elements included in a plurality of human input elements that are a part of the hand and one or more tapping actions performed on the second touch screen by one or more human input elements included in a plurality of human input elements that are a part of the foot are detected. Step 2006 may be performed in any of the ways described herein.

In step 2008, a relative position on the first touch screen of each of the one or more tapping actions performed by the hand is determined with respect to the first reference position. Step 2008 may be performed in any of the ways described herein.

In step 2010, a relative position on the second touch screen of each of the one or more tapping actions performed by the foot is determined with respect to the second reference position. Step 2010 may be performed in any of the ways described herein.

In step 2012, one or more data entry commands associated with the tapping actions performed by the hand and the foot are identified based on the relative position of each of the one or more tapping actions performed by the hand with respect to the first reference position and the relative position of each of the one or more tapping actions performed by the foot with respect to the second reference position. Step 2012 may be performed in any of the ways described herein.

Figure 21:
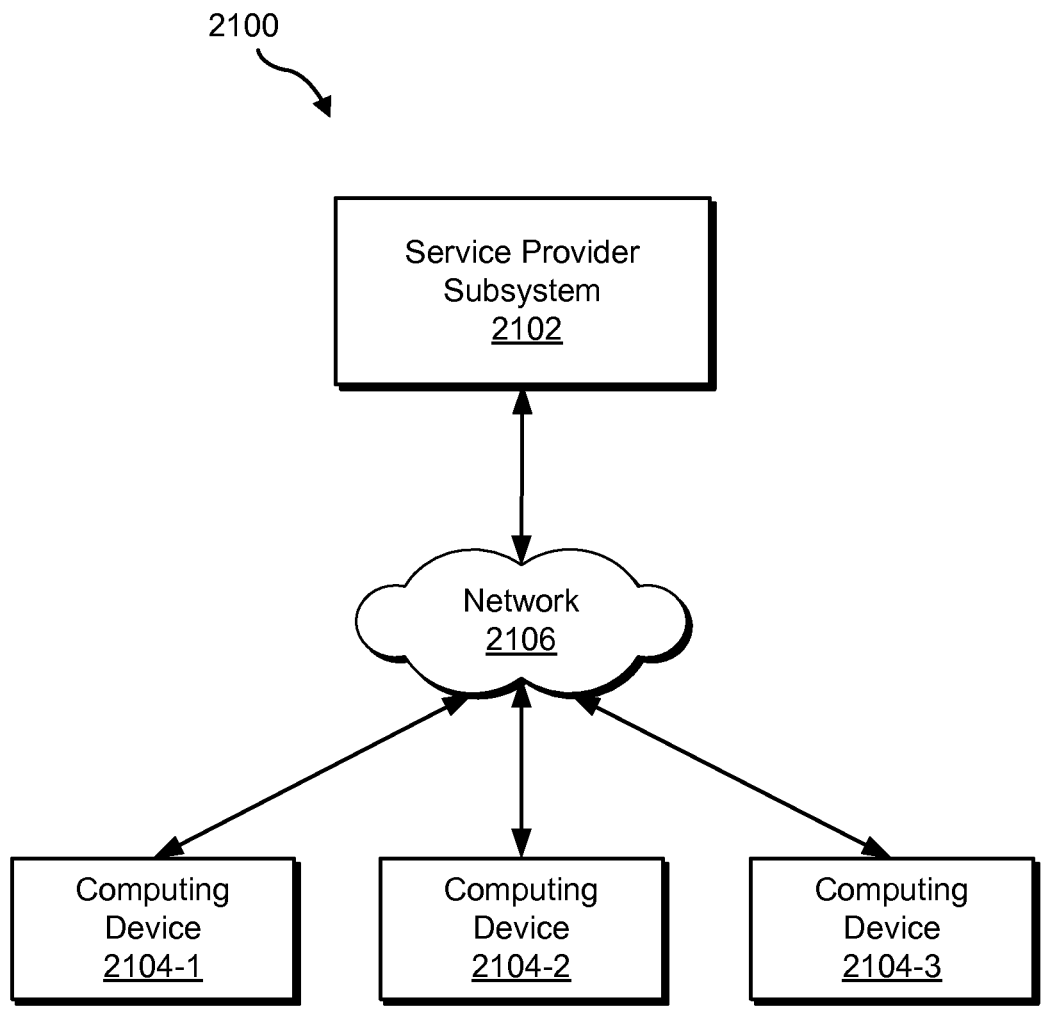
FIG. 21 illustrates another exemplary implementation of the data entry system of FIG. 1 according to principles described herein.

As mentioned, data entry system 100 may be at least partially implemented by a service provider subsystem configured to communicate with one or more computing devices by way of a network. In this manner, a user may provide data entry commands to any appropriately configured computing device communicatively coupled to the service provider subsystem by way of any platform-specific network. To illustrate, FIG. 21 illustrates an exemplary implementation 2100 of data entry system 100 wherein a service provider subsystem 2102 is communicatively coupled to a plurality of computing devices 2104 (e.g., computing devices 2104-1 through 2104-3). Detection facility 102, data entry facility 104, and storage facility 106 may each be implemented by service provider subsystem 2102 and/or any one of computing devices 2104.

Service provider subsystem 2102 may include any combination of components associated with or otherwise managed by a service provider (e.g., a network service provider), a content provider, and/or any other entity as may serve a particular implementation. For example, service provider subsystem 2102 may include, but is not limited to, one or more servers, personal computers, and/or other computing devices. Computing devices 2104 may include any of the computing devices described herein. For example, data entry system 100 may be implemented by a personal computer connected to a touch screen monitor, a tablet computer, a mobile phone, a personal digital assistant, a portable media player, a gaming device, and/or any other type of computing device as may serve a particular implementation.

Service provider subsystem 2102 and computing devices 2104 may communicate using any suitable communication technologies, devices, networks, media, and protocols supportive of remote data communications. For example, as shown in FIG. 21, service provider subsystem 2102 may be configured to communicate with computing devices 2104 over a network 2106 (and communications links thereto). Network 2106 may include one or more networks or types of networks capable of carrying communications and/or data signals between service provider subsystem 2102 and computing devices 2104. For example, network 2106 may include, but is not limited to, a subscriber television network, a provider-specific network (e.g., a Verizon® FIOS® network), a cable network, an optical fiber network, a hybrid fiber coax network, a wireless network (e.g., a Wi-Fi and/or mobile phone network), a satellite network, a wireless broadcast network (e.g., a satellite media broadcasting network or terrestrial broadcasting network), the Internet, an intranet, a local area network, any other suitable network, and any combination or sub-combination of these networks.

Service provider subsystem 2102 and computing devices 2104 may communicate over network 2106 using any suitable communication technologies, devices, media, and protocols supportive of remote data communications, including, but not limited to, data transmission media, communications devices, Transmission Control Protocol ("TCP"), Internet Protocol ("IP"), File Transfer Protocol ("FTP"), Telnet, Hypertext Transfer Protocol ("HTTP"), Real Time Protocol ("RTP"), User Datagram Protocol ("UDP"), Ethernet, and any other suitable communications technologies, devices, media, and protocols.

While FIG. 21 shows service provider subsystem 2102 and computing devices 2104 communicatively coupled via network 2106, it will be recognized that service provider subsystem 2102 and computing devices 2104 may be configured to communicate one with another in any other suitable manner (e.g., via a direct connection).

In some examples, service provider subsystem 2102 may be configured to support communication with computing devices 2104 by way of multiple network platforms. In this manner, a user may utilize multiple computing devices, each associated with a different network platform, in accordance with the methods and systems described herein.

Figure 22:
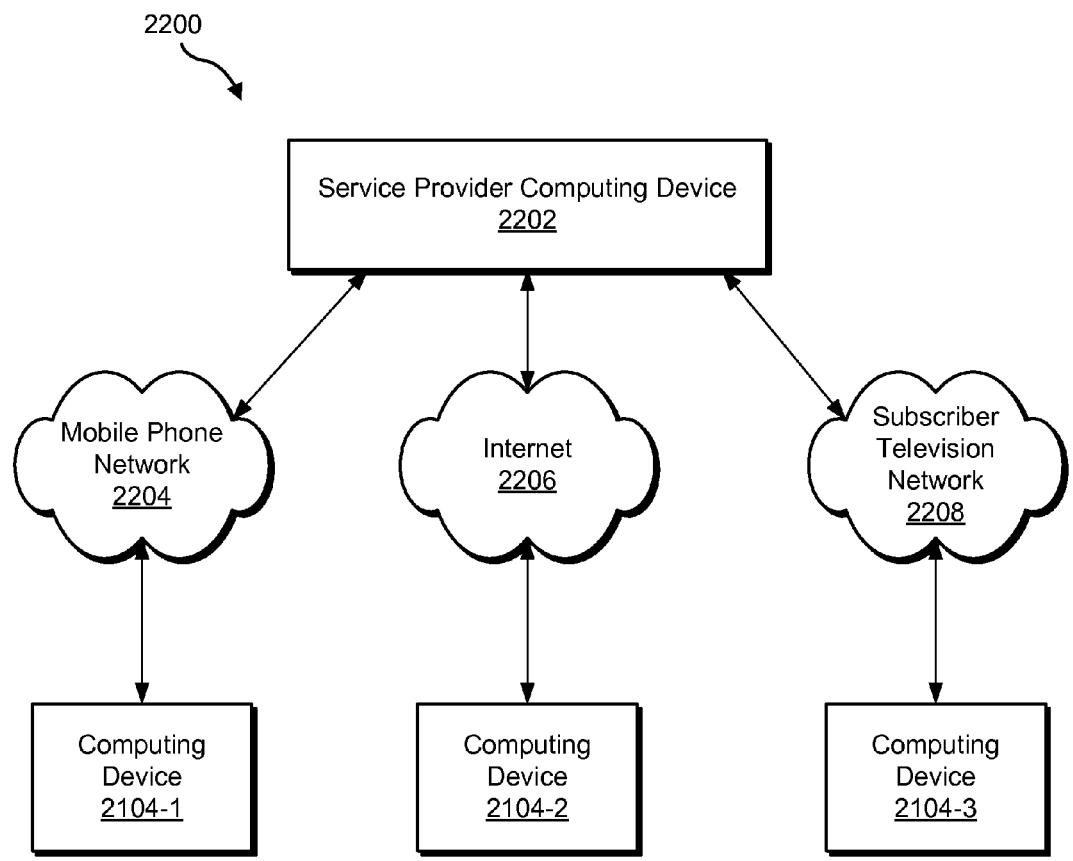
FIG. 22 illustrates another exemplary implementation of the data entry system of FIG. 1 according to principles described herein.

To illustrate, FIG. 22 shows an exemplary implementation 2200 of system 100 wherein a service provider computing device 2202 is configured to communicate with a plurality of computing devices 2104 over distinct network platforms. Service provider computing device 2202 may include one or more computing devices implementing service provider subsystem 2102 and may be configured to communicate with computing device 2104-1 (e.g., a mobile phone or tablet computer) over a mobile phone network 2204, with computing device 2104-2 (e.g., a personal computer) over the Internet 2206, and/or with computing device 2104-3 (e.g., a set-top box device) over a subscriber television network 2208. It will also be recognized that the networks shown in FIG. 22 are merely illustrative of the many different types of networks that may facilitate communication between service provider subsystem 2102 and computing devices 2104.

In some examples, data input system 100 is at least partially implemented by service provider computing device 2202. For example, service provider computing device 2202 may include a storage device configured to maintain relationship data customized for a particular user. Service provider computing device 2202 may further include a processor communicatively coupled to the storage device and configured to detect that the particular user is interacting with a touch screen of any of computing devices 2104 (e.g., computing device 2104-1) communicatively coupled to service provider computing device 2202 by way of a network (e.g., mobile phone network 2204), detect one or more tapping actions performed on the touch screen by the particular user, and identify one or more data entry commands associated with the one or more tapping actions based on a relative position of each of the one or more tapping actions with respect to one or more reference positions on the touch screen and in accordance with the maintained relationship data. In this manner, computing devices 2104 do not have to locally store relationship data and/or user profile data associated with the user. Because relationship data and/or user profile data is not stored locally at computing devices 2104, security of such data is enhanced.

Figure 23:
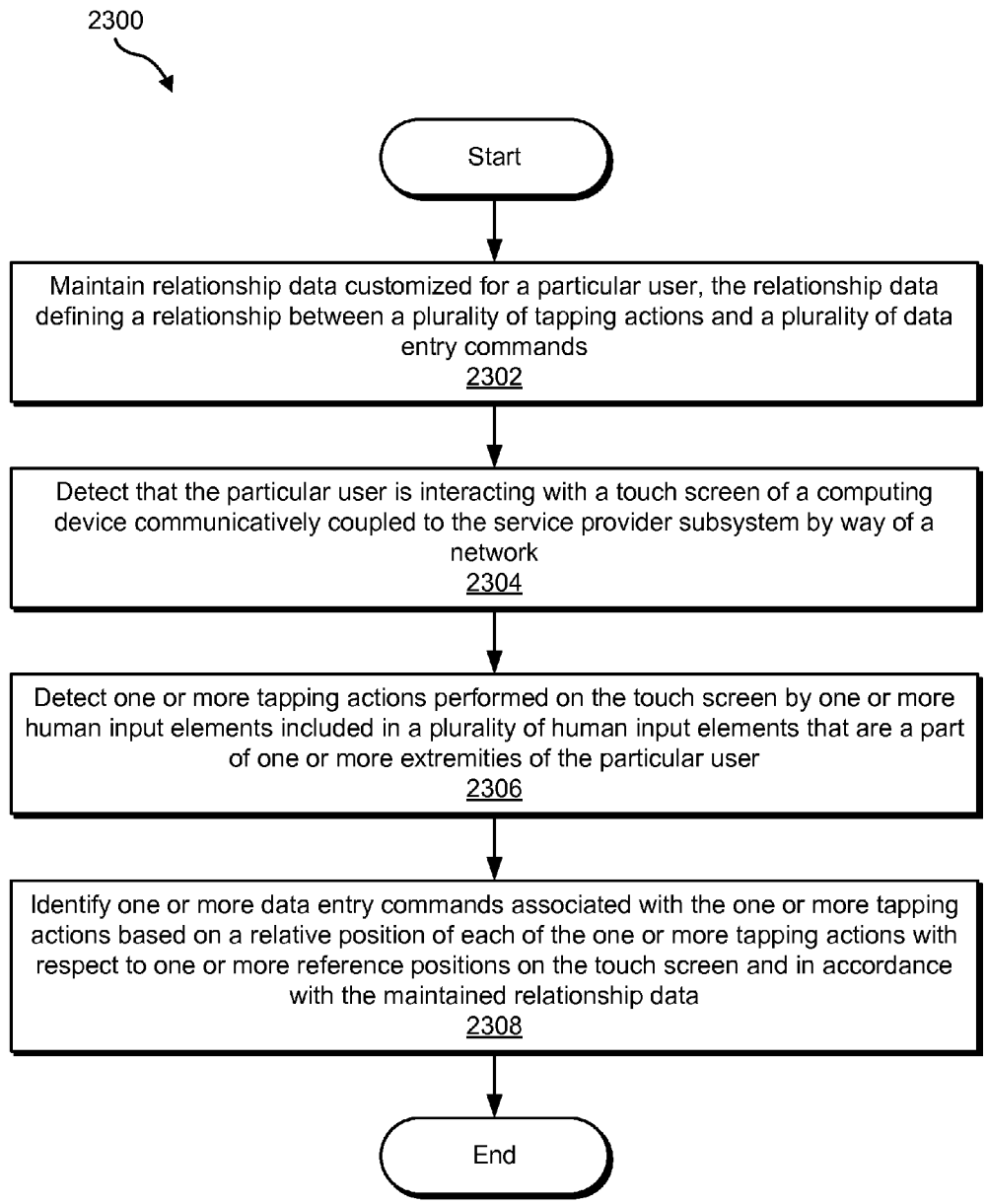
FIG. 23 illustrates another exemplary method of facilitating data entry by way of a touch screen according to principles described herein.

FIG. 23 illustrates another exemplary method 2300 of facilitating data entry by way of a touch screen. In method 2300, a service provider subsystem (e.g., service provider subsystem 2102) is configured to facilitate input by a user of one or more data entry commands into a local computing device. While FIG. 23 illustrates exemplary steps according to one embodiment, other embodiments may omit, add to, reorder, and/or modify any of the steps shown in FIG. 23. One or more of the steps shown in FIG. 23 may be performed by any component or combination of components of service provider subsystem 2102.

In step 2302, a service provider subsystem maintains relationship data customized for a particular user. The relationship data defines a relationship between a plurality of tapping actions and a plurality of data entry commands. Step 2302 may be performed in any of the ways described herein.

In step 2304, the service provider subsystem detects that the particular user is interacting with a touch screen of a computing device communicatively coupled to the service provider subsystem by way of a network. Step 2304 may be performed in any of the ways described herein.

In step 2306, the service provider subsystem detects one or more tapping actions performed on the touch screen by one or more human input elements included in a plurality of human input elements that are a part of one or more extremities of the particular user. Step 2306 may be performed in any of the ways described herein.

In step 2308, the service provider subsystem Identifies one or more data entry commands associated with the one or more tapping actions based on a relative position of each of the one or more tapping actions with respect to one or more reference positions on the touch screen and in accordance with the maintained relationship data. Step 2308 may be performed in any of the ways described herein.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 24:
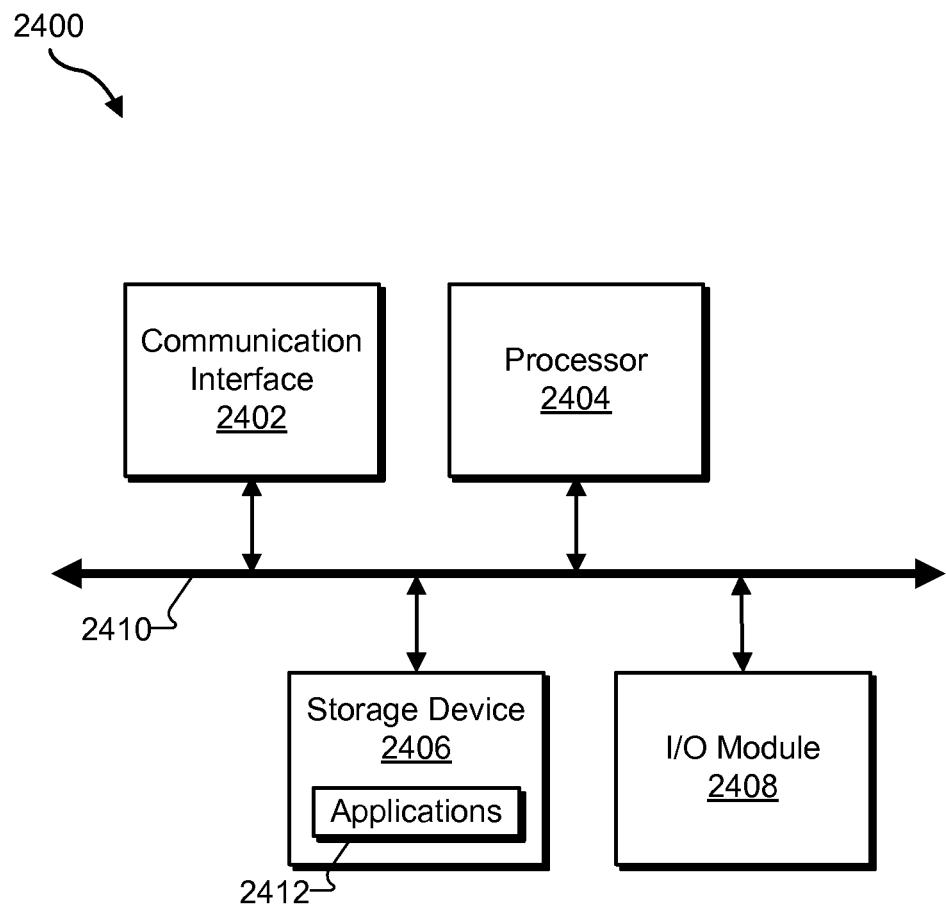
FIG. 24 illustrates an exemplary computing device according to principles described herein.

FIG. 24 illustrates an exemplary computing device 2400 that may be configured to perform one or more of the processes described herein. As shown in FIG. 24, computing device 2400 may include a communication interface 2402, a processor 2404, a storage device 2406, and an input/output ("I/O") module 2408 communicatively connected via a communication infrastructure 2410. While an exemplary computing device 2400 is shown in FIG. 24, the components illustrated in FIG. 24 are not intended to be limiting. Additional or alternative components may be used in other embodiments. Components of computing device 2400 shown in FIG. 24 will now be described in additional detail.

Communication interface 2402 may be configured to communicate with one or more computing devices. Examples of communication interface 2402 include, without limitation, a wired network interface (such as a network interface card), a wireless network interface (such as a wireless network interface card), a modem, an audio/video connection, and any other suitable interface.

Processor 2404 generally represents any type or form of processing unit capable of processing data or interpreting, executing, and/or directing execution of one or more of the instructions, processes, and/or operations described herein. Processor 2404 may direct execution of operations in accordance with one or more applications 2412 or other computer-executable instructions such as may be stored in storage device 2406 or another computer-readable medium.

Storage device 2406 may include one or more data storage media, devices, or configurations and may employ any type, form, and combination of data storage media and/or device. For example, storage device 2406 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 2406. For example, data representative of one or more executable applications 2412 (which may include, but are not limited to, one or more of the software applications described herein) configured to direct processor 2404 to perform any of the operations described herein may be stored within storage device 2406. In some examples, data may be arranged in one or more databases residing within storage device 2406.

I/O module 2408 may be configured to receive user input and provide user output and may include any hardware, firmware, software, or combination thereof supportive of input and output capabilities. For example, I/O module 2408 may include hardware and/or software for capturing user input, including, but not limited to, a keyboard or keypad, a touch screen component (e.g., touch screen display), a receiver (e.g., an RF or infrared receiver), and/or one or more input buttons.

I/O module 2408 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 2408 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 2400. For example, one or more applications 2412 residing within storage device 2406 may be configured to direct processor 2404 to perform one or more processes or functions associated with detection facility 102 and/or data entry management facility 104. Likewise, storage facility 106 may be implemented by or within storage device 2406.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   detecting, by a data entry system, an initialization action performed by a first extremity of a user and a second extremity of the user with respect to a touch screen associated with a computing device, the initialization action comprising a touching of a first arbitrary location on the touch screen by the first extremity of the user and a touching of a second arbitrary location on the touch screen by the second extremity of the user;
   designating, by the data entry system in response to the initialization action, the first arbitrary location as a first reference position associated with the first extremity and the second arbitrary location as a second reference position associated with the second extremity;
   detecting, by the data entry system, one or more tapping actions performed on the touch screen by one or more human input elements included in a plurality of human input elements that are a part of the first and second extremities;
   determining, by the data entry system, a relative position on the touch screen of each of the one or more tapping actions with respect to the first and second reference positions; and
   identifying, by the data entry system, one or more data entry commands associated with the one or more tapping actions based on the relative position of each of the one or more tapping actions with respect to the first and second reference positions.

2. The method of claim 1, wherein the one or more data entry commands are each representative of one or more text characters, and wherein the method further comprises directing, by the data entry system, the computing device to display one or more text characters represented by each of the one or more data entry commands on the touch screen.

3. The method of claim 1, further comprising maintaining, by the computing system, relationship data defining a relationship between each of the one or more tapping actions and the one or more data entry commands associated with the one or more tapping actions.

4. The method of claim 3, wherein the identifying of the one or more data entry commands associated with the one or more tapping actions comprises using the relationship data to identify the one or more data entry commands associated with the one or more tapping actions.

5. The method of claim 3, further comprising customizing, by the data entry system, the relationship data to the user.

6. The method of claim 1, further comprising performing, by the data entry system before the detecting of the initialization action, a training procedure configured to determine a relative distance between each of the human input elements that are a part of the first extremity of the user and a relative distance between each of the human input elements that are a part of the second extremity of the user.

7. The method of claim 1, further comprising:
   detecting, by the data entry system after the one or more tapping actions are performed by the one or more human input elements, another initialization action performed by the first and second extremities of the user, the another initialization action comprising a touching of a third arbitrary location on the touch screen by the first extremity of the user and a touching of a fourth arbitrary location on the touch screen by the second extremity of the user;
   designating, by the data entry system in response to the another initialization action, the third arbitrary location as a third reference position associated with the first extremity and the fourth arbitrary location as a fourth reference position associated with the second extremity;
   detecting, by the data entry system, one or more additional tapping actions performed on the touch screen by one or more human input elements included in the plurality of human input elements that are a part of the first and second extremities;
   determining, by the data entry system, a relative position on the touch screen of each of the one or more additional tapping actions with respect to the third and fourth reference positions; and
   identifying, by the data entry system, one or more data entry commands associated with the one or more additional tapping actions based on the relative position of each of the one or more additional tapping actions with respect to the third and fourth reference positions.

8. The method of claim 1, further comprising directing, by the data entry system, the computing device to display one or more reference markers on the touch screen, the one or more reference markers configured to graphically indicate one or more detection zones on the touch screen that are associated with one or more of the human input elements.

9. The method of claim 1, wherein the first extremity comprises a first hand of the user and the second extremity comprises a second hand of the user.

10. The method of claim 9, wherein, for each of the hands of the user, the plurality of human input elements comprise a thumb, an index finger, a middle finger, a ring finger, a little finger, a medial palm portion, a lateral palm portion, first and second medial side portions, and first and second lateral side portions.

11. The method of claim 1, wherein the first extremity comprises a first foot of the user and the second extremity comprises a second foot of the user.

12. The method of claim 1, further comprising directing, by the data entry system, the computing device to not display anything on the touch screen while the one or more tapping actions are performed on the touch screen.

13. The method of claim 1, wherein the data entry subsystem is implemented by at least one service provider computing device communicatively coupled to the computing device by way of a network.

14. The method of claim 1, embodied as computer-executable instructions on at least one non-transitory computer-readable medium.

15. A method comprising:
   detecting, by a data entry system, an initialization action performed by a single extremity of a user with respect to a touch screen associated with a computing device, the initialization action comprising a touching of an arbitrary location on the touch screen by the single extremity of the user;
   designating, by the data entry system in response to the initialization action, the arbitrary location as a reference position on the touch screen;
   detecting, by the data entry system, one or more tapping actions performed on the touch screen by one or more human input elements included in a plurality of human input elements that are a part of the single extremity;
   determining, by the data entry system, a relative position on the touch screen of each of the one or more tapping actions with respect to the reference position; and
   identifying, by the data entry system, one or more data entry commands associated with the one or more tapping actions based on the relative position of each of the one or more tapping actions with respect to the reference position.

16. The method of claim 15, wherein the single extremity comprises a hand of the user or a foot of the user.

17. The method of claim 15, embodied as computer-executable instructions on at least one non-transitory computer-readable medium.

18. A method comprising:
   detecting, by a data entry system, an initialization action performed by a hand and a foot of a user, the initialization action comprising a touching of a first arbitrary location on a first touch screen associated with a computing device by the hand of the user and a touching of a second arbitrary location on a second touch screen associated with the computing device by the foot the user;
   designating, by the data entry system in response to the initialization action, the first arbitrary location on the first touch screen as a first reference position associated with the hand of the user and the second arbitrary location on the second touch screen as a second reference position associated with the foot of the user;
   detecting, by the data entry system, one or more tapping actions performed on the first touch screen by one or more human input elements included in a plurality of human input elements that are a part of the hand and one or more tapping actions performed on the second touch screen by one or more human input elements included in a plurality of human input elements that are a part of the foot;
   determining, by the data entry system, a relative position on the first touch screen of each of the one or more tapping actions performed by the hand with respect to the first reference position;
   determining, by the data entry system, a relative position on the second touch screen of each of the one or more tapping actions performed by the foot with respect to the second reference position; and
   identifying, by the data entry system, one or more data entry commands associated with the tapping actions performed by the hand and the foot based on the relative position of each of the one or more tapping actions performed by the hand with respect to the first reference position and the relative position of each of the one or more tapping actions performed by the foot with respect to the second reference position.

19. The method of claim 18, embodied as computer-executable instructions on at least one non-transitory computer-readable medium.

20. A method comprising:
maintaining, by a service provider subsystem, relationship data customized for a particular user, the relationship data defining a relationship between a plurality of tapping actions and a plurality of data entry commands;
detecting, by a service provider subsystem, that the particular user is interacting with a touch screen of a computing device communicatively coupled to the service provider subsystem by way of a network;
detecting, by the service provider subsystem, one or more tapping actions performed on the touch screen by one or more human input elements included in a plurality of human input elements that are a part of one or more extremities of the particular user; and
identifying, by the service provider subsystem, one or more data entry commands associated with the one or more tapping actions based on a relative position of each of the one or more tapping actions with respect to one or more reference positions on the touch screen and in accordance with the maintained relationship data.

21. The method of claim 20, further comprising:
detecting, by a service provider subsystem, that the particular user is interacting with another touch screen of another computing device communicatively coupled to the service provider subsystem by way of another network;
detecting, by the service provider subsystem, one or more tapping actions performed on the another touch screen by one or more human input elements included in the plurality of human input elements that are a part of the one or more extremities of the particular user; and
identifying, by the service provider subsystem, one or more data entry commands associated with the one or more tapping actions performed on the another touch screen based on a relative position of each of the one or more tapping actions with respect to one or more reference positions on the another touch screen and in accordance with the maintained relationship data.

22. The method of claim 20, further comprising:
maintaining, by a service provider subsystem, additional relationship data customized for an additional user;
detecting, by a service provider subsystem, that the additional user is interacting with the touch screen of the computing device;
detecting, by the service provider subsystem, one or more tapping actions performed on the touch screen by one or more human input elements included in a plurality of human input elements that are a part of one or more extremities of the additional user; and
identifying, by the service provider subsystem, one or more data entry commands associated with the one or more tapping actions performed by the additional user based on a relative position of each of the one or more tapping actions performed by the additional user with respect to one or more additional reference positions on the touch screen and in accordance with the maintained additional relationship data.

23. A data entry system comprising:
a detection facility configured to detecting an initialization action performed by a first extremity of a user and a second extremity of the user with respect to a touch screen associated with a computing device, the initialization action comprising a touching of a first arbitrary location on the touch screen by the first extremity of the user and a touching of a second arbitrary location on the touch screen by the second extremity of the user; and
a data entry management facility communicatively coupled to the detection facility and configured to designate, in response to the initialization action, the first arbitrary location as a first reference position associated with the first extremity and the second arbitrary location as a second reference position associated with the second extremity;
wherein the detection facility is further configured to detect one or more tapping actions performed on the touch screen by one or more human input elements included in a plurality of human input elements that are a part of the first and second extremities; and
wherein the data entry management facility is further configured to
determine a relative position on the touch screen of each of the one or more tapping actions with respect to the first and second reference positions, and
identify one or more data entry commands associated with the one or more tapping actions based on the relative position of each of the one or more tapping actions with respect to the first and second reference positions.

24. The data entry system of claim 23, wherein the detection facility and data entry management facility are implemented by at least one service provider computing device communicatively coupled to the computing device by way of a network.

25. A service provider computing device comprising:
a storage device configured to maintain relationship data customized for a particular user, the relationship data defining a relationship between a plurality of tapping actions and a plurality of data entry commands; and
a processor communicatively coupled to the storage device and configured to
detect that the particular user is interacting with a touch screen of a computing device communicatively coupled to the service provider computing device by way of a network,
detect one or more tapping actions performed on the touch screen by one or more human input elements included in a plurality of human input elements that are a part of one or more extremities of the particular user, and
identify one or more data entry commands associated with the one or more tapping actions based on a relative position of each of the one or more tapping actions with respect to one or more reference positions on the touch screen and in accordance with the maintained relationship data.

* * * * *